(12) United States Patent
Cohen et al.

(10) Patent No.: US 8,391,143 B2
(45) Date of Patent: Mar. 5, 2013

(54) CLASSIFICATION AND VERIFICATION OF STATIC FILE TRANSFER PROTOCOLS

(75) Inventors: Bram Cohen, Mill Valley, CA (US); David Harrison, San Francisco, CA (US)

(73) Assignee: BitTorrent, Inc., San Francisco, CA (US)

(*) Notice: Subject to any disclaimer, the term of this patent is extended or adjusted under 35 U.S.C. 154(b) by 0 days.

(21) Appl. No.: 13/096,828

(22) Filed: Apr. 28, 2011

(65) Prior Publication Data

US 2011/0202679 A1 Aug. 18, 2011

Related U.S. Application Data

(63) Continuation of application No. 11/764,791, filed on Jun. 18, 2007, now Pat. No. 7,957,280.

(60) Provisional application No. 60/805,025, filed on Jun. 16, 2006.

(51) Int. Cl.
*G01R 31/08* (2006.01)
*H04L 12/28* (2006.01)
*H04L 12/56* (2006.01)
*H04J 3/16* (2006.01)

(52) U.S. Cl. ........ 370/230; 370/389; 370/394; 370/469; 370/401; 709/232

(58) Field of Classification Search .................. None
See application file for complete search history.

(56) References Cited

U.S. PATENT DOCUMENTS

| | | | | |
|---|---|---|---|---|
| 7,453,892 B2 * | 11/2008 | Buskirk et al. | ................ | 370/401 |
| 2002/0163920 A1 * | 11/2002 | Walker et al. | ................ | 370/401 |
| 2007/0083772 A1 * | 4/2007 | Harada et al. | ................ | 713/193 |
| 2007/0094139 A1 * | 4/2007 | Martinez | ................ | 705/40 |
| 2007/0121615 A1 * | 5/2007 | Weill et al. | ................ | 370/389 |

FOREIGN PATENT DOCUMENTS

EP 0802677 A1 * 10/1997

* cited by examiner

*Primary Examiner* — Ayaz Sheikh
*Assistant Examiner* — Sori Aga
(74) *Attorney, Agent, or Firm* — Fenwick & West LLP

(57) ABSTRACT

Classification and verification of static file transfer protocols is provided. A network node sitting in the path of packets classifies traffic according to its content, and then statistically verifies that the content actually matches the initial classification. Classification and verification are standard building blocks in networks systems that provide quality-of-service. However, unlike traditional quality-of-service building blocks, a system of the present invention takes a trust-but-verify approach, and thus can rely on longer-timescale statistical online or offline verification to reduce computational requirements. This improves scalability and reduces the cost and complexity that in part has prevented prior service differentiation systems from succeeding in the Internet. Internet Service Providers (ISPs) can combine the classification and verification building blocks with a networked directory service to allow further classification as to whether particular content is for pay.

20 Claims, 13 Drawing Sheets

(a)

(b)

BUSY-DETECT(s)

1  when segment s arrives in connection c:
2  $i \leftarrow 0, len \leftarrow 0$
3  if $|s.payload| > thresh$
4      then return BUSY
5  while $i < |s.payload| - 4$
6      do
7          $len = s.payload[i : i + 4]$
8          if $len == 0$
9              then $i = i + 4$
10                 continue  ▷ may be keep-alive
11         $op = s.payload[i + 4]$
12         if $op ==$ PIECE
13             then return BUSY
14 return IDLE

Fig. 6 on connection open:

1   $b \leftarrow \textit{false}, r \leftarrow 4, \textit{buf} \leftarrow [\ ]$
2   $\textit{sync} = \text{SYNC}()$    ▷ instantiate generator on TCP segment $s$ arrival:

1   if $s.\textit{seqno} + |s.\textit{payload}| - 1$ seen before
2       then return
3   $i \leftarrow$ index of 1st byte not seen before
4   while $i + r < |s.\textit{payload}|$
5       do if $b$
6           then $\textit{buf.append}(s.\textit{payload}[i : i + r])$
7              $i = i + r$
8              $r, b = \textit{sync}(\textit{buf})$
9              $\textit{buf} = [\ ]$
10  $r = r - (|s.\textit{payload}| - i)$
11  if $b$
12      then $\textit{buf.append}(s.\textit{payload}[i : |s.\textit{payload}|])$

SYNC:

1   while true
2       do ▷ synchronized on message boundary
3           $\textit{len} = $ yield $4, \textit{true}$
4           yield $\textit{len}, \textit{false}$

*Fig. 7*

Table I
Message Types In The BitTorrent Protocol

| Abbrev. | Op | Type | Arguments |
|---|---|---|---|
| C | 0x00 | choke | none |
| U | 0x01 | unchoke | none |
| I | 0x02 | interested | none |
| NI | 0x03 | not interested | none |
| H | 0x04 | have | integer |
| BF | 0x05 | bitfield | bit array |
| R | 0x06 | request | integer, integer, integer |
| P | 0x07 | piece | integer, integer, byte array |
| CA | 0x08 | cancel | integer, integer, integer |
| PO | 0x09 | port[1] | short |
| WM | 0x0a | want metainfo[2] | none |
| M | 0x0b | metainfo[2] | byte array |
| SUS | 0x0c | suspect[2] | integer |
| SUG | 0x0d | suggest[3] | integer |
| HA | 0x0e | have all[3] | none |
| HN | 0x0f | have none[3] | none |
| REJ | 0x10 | reject[3] | integer, integer |
| FAS | 0x11 | allowed fast[3] | integer |

[1] DHT extension
[2] cache extension
[3] fast extension

*Fig. 8*

```
1  S = { }                          ▷ synchronizer tuples
2  numpieces, piecelen from matainfo.
``` on TCP segment s arrival:
```
1   if s.seqno + | s.payload | − 1 seen before
2       then return
3   i ← index of 1st byte no seen before
4   B = { }                         ▷ set of marked bytes
5   try
6       for (r, b, buf, sync) ∈ S
7           do try
8               ASSEMBLEBYTES(i, r, b, buf, sync)
9           except INVALID
10              remove tuple containing sync from S
11      for i ∈ [0, | s.payload |) and i ∉ B and | S | < n
12          do sync = SYNC2()       ▷ instantiate generator
13          try
14              r ← 4, b ← true, buf ← [ ]
15              S.add( (r, b, buf, sync) )
16              ASSEMBLEBYTES(i, r, b, buf, sync)
17          except INVALID
18              remove tuple containingsyncfromS
19  except SYNCHRONIZED
20      Done.                       ▷ switch to SYNC
```

*Fig. 9*

ASSEMBLYBYTES(i, ref r, ref b, ref buf, ref sync):
```
1  while i + r < | s.payload |
2      do if b
3          then buf.append(s.payload[i : i + r])
4              i = i+r
5              r, b = sync(i, buf)
6              Buf = [ ]
7  r = r − (|s.payload| − i)
8  if b
9      then buf.append(s.payload[i : | s.payload |])
```

*Fig. 10*

SYNC2:
```
1   Valid ← 0, i ← 0
2   while valid < THRESH
3       do if i ∈ B    ▷ If already tested starting here...
4           then raise INVALID
5       B.add(i).   ▷ Mark message beginning.
6       i, len = yield 4, true   ▷ buf put in len.
7       if len == 0                    ▷ Keep-alive
8           then valid = valid + 4
9                continue
10      i, op = yield 1, true
11      if op ∈ {I, NI, C, U, WM}
12          then if len == 1
13              then valid = valid + 5
14              else raise INVALID
15      elseif op ∈ {H, SUG, SUS, FAS}
16          then if len == 5
17              then valid = valid + 5
18              else raise INVALID
19          i, index = yield 4, true
20          valid + = VALIDINDEX(index)
21      elseif op == R
22          then if len == 13
23              then valid = valid + 5
24              else raise INVALID
25          i, index = yield 4, true
26          valid + = VALIDINDEX(index)
27          i, off = yield 4, true
28          valid + = VALIDOFFSET(off)
29          i, length = yield 4, true
30          valid + =
                VALIDOFFSET(off, length)
31      elseif op == M
32          then valid = valid + 1
33              i, temp = yield len − 1, false
34      elseif op == p
35          then valid = valid + 1
36              valid + =
                VALIDLENGTH(0, len − 9)
37          i, index = yield 4, true
38          valid + = VALIDINDEX(index)
39          i, off = yield 4, true
40          valid + = VALIDOFFSET(off)
41          if off + len − 9 > piecelen
42              then raise INVALID
43          i, temp = yield len − 9, false
44      else if op ∈ {BF, HA, HN}
45          raise INVALID
46  raise SYNCHRONIZED
```

Fig. 11

VALIDINDEX(*index*):
1   if *index* >= *numpieces*
2      then raise INVALID
3   if *numpieces* < $2^8$
4      then return 3
5   elseif *numpieces* < $2^{16}$
6      then return 2
7   elseif *numpieces* < $2^{24}$
8      then return 1
9   return 0

VALIDOFFSET(*off*):
1   if *off* > *piecelen*
2      then raise INVALID
3   if *piecelen* < $2^8$
4      then return 3
5   elseif *piecelen* < $2^{16}$
6      then return 2
7   elseif *piecelen* < $2^{24}$
8      then return 1
9   return 0

VALIDLENGTH(*off, length*):
1   if *off* + *length* > *piecelen*
2      then raise INVALID
3   if *piecelen* < $2^8$
4      then return 3
5   elseif *piecelen* < $2^{16}$
6      then return 2
7   elseif *piecelen* < $2^{24}$
8      then return 1
9   return 0

*Fig. 12*

Table II
Methods In A Complete Network-Layer BitTorrent Verifier

| Method | Parameters[1] | State |
| --- | --- | --- |
| d-bit-aligned k-random m-bit-string sampling | $d = 8$ or $32$, $k$, $m \geq 64$ | $k$ bit strings per monitored torrent, 1 bit-string buffer per connection monitor, count of number of bits (bytes) left to read. |
| busy-period detection | $thresh = 20$ | None[2]. |
| k-binomial busy-period connection-sampling | $k$, $p = 10\%$, | None[3]. |
| exponential metering | $\tau = 5$ minutes | For each meter: $t$ of next meter switch, average rate, byte count.[4] |
| normalized n-BitTorrent-synchronizer | $n = 4$, THRESH $= 26$ | Per monitored torrent[5]: *piecelen, numpieces*. Per connection synchronizing per direction: up to $n$ synchronizers each with integers *valid, maxseqno*, and $r$; boolean $b$; a 4 byte *Buf*; and the address of the yield in the sync generator. |
| known-syntax verification | None. | Per monitored connection per direction: integers $r$ and *maxseqno*, boolean $b$; a 4 byte *buf*; and the address of the yield in the *sync* generator. |
| range verification | None. | Per monitored torrent: *piecelen, numpieces*. Per monitored connection per direction: can share state with known-Syntax verification. |
| allow-only-one-metainfo | None. | Per monitored connection per direction: boolean. |
| antiny | $cnt_0 = 10$ | Per monitored connection per direction: integer token bucket count. |
| at-most-n-below-observed-maxsize | $k = 5$, $n = 5$ | Per monitored connection per direction: 1-byte[6] integers for number blocks read, max size, and number below max. |
| at-most-n-below conventional-minsize | $minsize = 2^{13}$, $n = 5$ | Per monitored connection per direction: 1-byte[6] for number blocks read, max size, and number below min. |
| have-request reclassification | $\rho_r = 1.5$, $\sigma_r = q$, $\rho_h = m$, $\sigma_h = c$ | Per monitored connection per direction: integer token bucket counter. Per monitored IP: integer token bucket counter. |
| any of the intention inference methods | | |
| intention timeouts. | $\tau = 5$ seconds | Per monitored connection per direction: timeout time. |

[1] with some suggested values. Other parameter values depend heavily on processor or memory constraints. For example, having more bit-strings for *d-bit-aligned k-random m-bit sampling* will always reduce the time to detect an infraction with a linear increase with a linear increase in memory requirements.
[2] State is only maintained during the invocation of the BUSY-DETECT procedure which is called on every packet arrival.
[3] The connection sampling method does not have any state of its own, but it implies that there are $k$ connection monitors each of which has state.
[4] The state for the rate meter depends on the rate averaging method. Several are satisfactory so long as they all start with low bias and approach an unbiased estimate. The initial bias avoids false positive busy-period detections when there are few samples. An example reasonable rate averaging method is an Exponentially Weighted Moving Average (EWMA) computed once per interval and initialized to a zero moving average.
[5] *piecelen* and *numpieces* are not considered parameters because they are obtained by the system rather than part of the configuration.
[6] One byte per integer refers to the smallest reasonable length integer that would satisfy the method. Longer length integers can be used.

Fig. 13

SYNTAXVERIFY:
1 while true
2     do *len*= yield 4, *true*    ▷ *buf* put in *len*.
3         if *len* == 0        ▷ Keep-alive
4             then continue
5         *op* = yield 1, *true*
6         if $op \in \{I, NI, C, U, WM, HA, HN\}$
7             then if $len \neq 1$
8                 then declare infraction
9         elseif $op \in \{H, SUG, SUS, FAS\}$
10             then if $len \neq 5$
11                 then declare infraction
12         elseif *op* == R
13             then if $len \neq 13$
14                 else *len* = *len* − 12
15                     yield 8, *false*
16                     *length* = yield 4, *true*
17                     if $length > 2^{17}$
18                         then declare infraction
19         elseif *op* == P
20             then if $len < 9$ or $len - 9 > 2^{17}$
21                 then declare infraction
22     yield *len* − 1, *false*

*Fig. 14*

CLASSIFICATION AND VERIFICATION OF STATIC FILE TRANSFER PROTOCOLS

CROSS-REFERENCE TO RELATED APPLICATIONS

This application is a continuation of U.S. patent application Ser. No. 11/764,791, filed Jun. 18, 2007, which claims the benefit of U.S. Provisional Application 60/805,025, filed Jun. 16, 2006, each of which is incorporated by reference herein in its entirety.

BACKGROUND OF THE INVENTION

1. Field of the Invention

The present invention is related to a network file transfer protocol. In particular, the present invention is directed toward classifying and verifying static file transfer protocols.

2. Description of the Related Art

Early electronic communication systems provided quality of service (QoS) guarantees. The analog public switched telephone network (PSTN) used electrically separate wires, and then switched to digital using time-division multiplexing. Both methods provide low delay with strict bandwidth guarantees. However, neither provides for variable bandwidth demands or cost-effectively scales to the large demand placed on today's networks.

As the Internet has taken over most data communications and an increasing percentage of voice communications, stalwarts have attempted to provide the same guarantees that were possible in the older TDMA and analog networks. Attempts include ATM, IETF IntServ, and IETF DiffServ (DS). ATM is still used today for routing aggregate traffic, but it has not been used as originally envisioned: as an end-to-end solution for providing guarantees to individual telephone calls, video streams, file transfers, and other multimedia sessions.

These QoS architectures have failed for various reasons, among them lack of an appropriate business model, management complexity, computational cost, and state maintenance overhead. When coupled with falling bandwidth costs, Internet Service Providers (ISPs) have chosen the alternative of over-provisioning bandwidth.

Peer-to-peer file sharing applications such as Gnutella, E-Mule, and BitTorrent when unchecked tend to behave incompatibly with over-provisioning, since they consume all available bandwidth. Peer-to-peer file sharing comprises about 60% of today's Internet traffic with the bulk generated by a handful of customers. As such, some ISPs strictly rate limit file sharing traffic in order to reduce the impact to loss-sensitive IP telephony and web traffic.

Asynchronous Transfer Mode (ATM), IntServ, and the Public-Switched Telephone Network (PSTN) provide service guarantees by first establishing a circuit or virtual circuit and reserving resources at every switch along the circuit's path. In PSTN, the circuits extend all the way to individual telephones and thus state maintained in each switch grows proportional to the number of telephone calls traversing the switch. ATM provides a richer set of service semantics appropriate for data, video, and voice, but likewise requires state proportional to the number of virtual circuits traversing a switch. ATM survives today by providing virtual circuits only for highly-aggregated traffic and without the service semantics appropriate to individual video or voice calls.

The Internet conversely maintains no per-call (per-flow) state. Instead of associating each call with a circuit, the Internet breaks content into individually-routed packets, each bearing a source and destination address. Thus, Internet routers have far less state maintenance and signaling overhead. IntServ was designed as the Internet's answer to ATM and the PSTN, but it too required maintaining per-flow state.

To reduce IntServ's state maintenance, the IETF proposed Differentiated Services (DiffServ), motivated principally by Van Jacobson et al., and David Clark et al. DiffServ defines classes analogous to the classes used by the United States Postal Service. In the postal system, every package bears a stamp or tag. Packages marked for overnight delivery are given priority sorting, and then flown to the destination city. Packages bearing first class stamps typically travel by cheaper and slower ground-based transportation. With differentiated service, every packet entering the network is marked to identify its class. More specifically, as shown in FIG. 1, every packet enters through an edge router, which meters, marks, rate limits, and polices traffic. Meters, markers, rate limiters, and policers are all traffic conditioning building blocks. If the network is adequately provisioned and traffic properly conditioned at the entry points then statistical service guarantees are possible. An example of an edge router includes Cisco's 7507 router.

As illustrated in FIG. 1a, ingress and egress edge routers sit in the path of packets entering each service provider's network. The edge router marks by inserting a number called a "codepoint" in the DS field in each packet's IP header. In the illustrated example, the edge stamps the packet with the number corresponding to Expedited Forwarding (EF). EF prescribes low-delay with strict rate limits, and is thus often proposed for use for Voice-over-IP. Interior routers then direct EF marked packets into a high priority queue separate from Best Effort (BE) packets. BE prescribes only that the network will give its "best effort" to deliver the packets, but packets may be lost, duplicated, or reordered and there is no guarantee on delay or bandwidth. Best Effort is most appropriate for applications that tolderate loss and delay such as mail and long file transfers. In the Internet and in this illustration, BE applies to all traffic that is not intentionally given special treatment. The intermediate routers do not distinguish between connections, and do not maintain per-flow state or queues. Intermediate edge routers may remark, delay, or drop packets to enforce policy.

FIG. 1b illustrates the building blocks found in a typical edge router sitting near end-users. As packets enter the edge router, they are first classified based on the source and destination IP address found in the packet's IP header and the source and destination port found in the packet's TCP header. The lookup returns the appropriate service class for the packet. The service class is then mapped onto the appropriate codepoint which is stamped into the DiffServ field in the packet's IP header and the source and destination port found in the packet's TCP header. The lookup returns the appropriate service class for the packet. The service class is then mapped onto the appropriate codepoint which is stamped into the DiffServ field in the packet's IP header. In this example, the edge router then steers ERF marked packets into per-connection queues that are appropriately rate-limited by the scheduler to ensure each connection adheres to a particular service descriptor, in this case specifying the connection's maximum rate. In this example, all best effort packets are dumped in a single lower-priority queue.

Using DiffServ, only edge routers are allowed to maintain per-flow state. Interior routers implement scheduling or buffer management components that maintain only per-class state. Since the number of classes is small and fixed, DiffServ reduces the amount of state routers must maintain compared to switches in ATM or public-switched telephone networks.

DiffServ suffers from the problem that neighboring service provider networks must either extend trust to create a single interior network spanning service-provider network boundaries, or they must place an edge router(s) at the peering point between the two networks. However, the peering point is one of the most heavily-trafficked points on the network and among the least capable of maintaining per-flow state.

SUMMARY OF THE INVENTION

The present invention enables classification and verification of static file transfer protocols. A network node sitting in the path of packets classifies traffic according to its content, and then statistically verifies that the content actually matches the initial classification. Classification and verification are standard building blocks in networks systems that provide quality-of-service. However, unlike traditional quality-of-service building blocks, a system of the present invention takes a trust-but-verify approach, and thus can rely on longer-timescale statistical online or offline verification to reduce computational requirements. This improves scalability and reduces the cost and complexity that in part has prevented prior service differentiation systems from succeeding in the Internet. Internet Service Providers (ISPs) can combine the classification and verification building blocks with a networked directory service to allow further classification as to whether particular content is for pay.

The classification and verification system and methods of the present invention can be used in the context of differentiated services, requiring neither upgrading potential bottlenecks nor modifying the structure of IP packet headers. The notion of edge routers is maintained.

As customers demand more bandwidth for peer-to-peer traffic, especially for legitimate peer-to-peer traffic, ISPs may have to revisit existing QoS architectures. The present invention enables implementation of building blocks that can be used in conjunction with or independently of DiffServ to provide incrementally better performance for specified file transfers.

A first building block performs content classification. A content classifier engine identifies content about to be transferred on a connection, and then maps the content onto a particular service treatment. In the context of class-of-service networks, such as those that implement DiffServ, the classifier engine maps onto a particular class. In one embodiment, the classifier engine uses a content ID appearing near the beginning of every connection. In the BitTorrent environment, an infohash is used for this purpose, but the content classification methods can be applied to any file transfer protocol that communicate such an ID.

A second building block performs content verification to determine whether the content being communicated matches the specified content identifier. In one embodiment, a content verification engine uses random bytes to perform the verification. In an alternative embodiment, piece hashes.

A third building block is a content directory. This directory maps a content ID to a service treatment. The content directory may be centralized or decentralized.

BRIEF DESCRIPTION OF THE DRAWINGS

FIG. 6 illustrates a method for busy-period detection in accordance with an embodiment of the present invention.

FIG. 7 illustrates a method for maintaining synchrony in accordance with an embodiment of the present invention.

FIG. 8 illustrates valid BitTorrent messages in accordance with an embodiment of the present invention.

FIG. 9 provides pseudocode for handling segment arrivals to the statistical synchronization method n-BitTorrent-synchronizer in accordance with an embodiment of the present invention.

FIG. 10 illustrates a method for simplifying synchronization code in accordance with an embodiment of the present invention.

FIG. 11 illustrates a method for performing statistical synchronization starting from a given index into a connection's byte stream in accordance with an embodiment of the present invention.

FIG. 12 illustrates a method for validating index, offset and length message fields in accordance with an embodiment of the present invention.

FIG. 13 summarizes methods for a complete network-layer BitTorrent verifier in accordance with an embodiment of the present invention.

FIG. 14 illustrates a method for performing known-syntax verification in accordance with an embodiment of the present invention.

Figure 1:
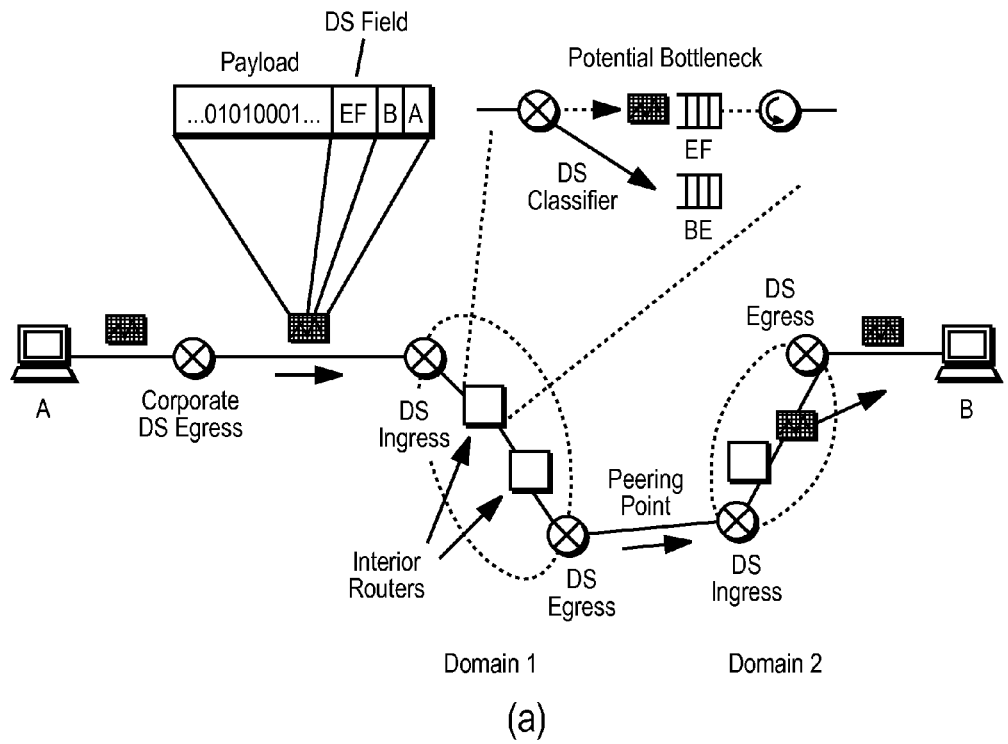
FIG. 1a illustrates ingress and egress edge routers.
FIG. 1b illustrates building blocks found in a typical edge router located near end-users.
Figure 1:
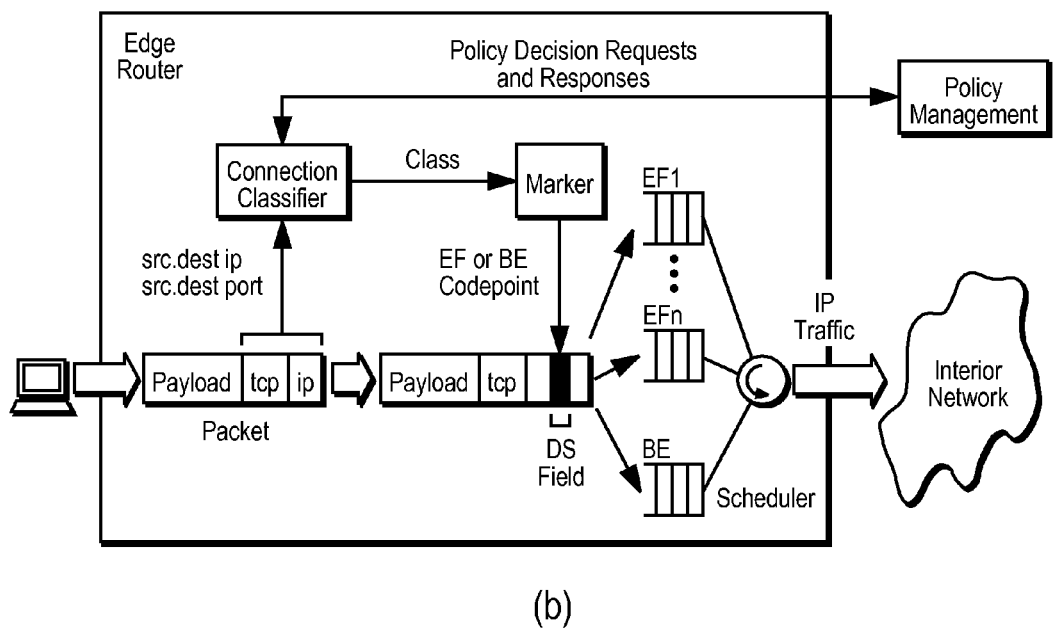

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Definitions

For purposes of the remaining discussion, it is helpful to set forth some definitions of terms. These definitions are not intended to limit the scope of the invention described here, but rather are intended to only increase the readability of the disclosure.

The term "connection" refers to any flow between an application running on one network node and an application on another. This applies not only to TCP but also to UDP and other transports that establish such flows.

Protocols that meet the requirements for the classification and verification building blocks are called "qualifying protocols". Specifically a qualifying protocol is any unicast file transfer protocol that meets the following requirements:

1) it can be used to transfer static files;
2) all of its connections have a content ID near the beginning, in BitTorrent this is the infohash;

3) every content ID must be globally unique with high probability or with certainty;
4) it breaks the static file into blocks and prepends a block-level identifier to block data in every block transferred; in BitTorrent the block identifier is the piece index and byte offset; and
5) it uses either fixed-length blocks or specifies the length of the block with every block transferred.

The present invention has application to transfer protocols used to transfer static content. Qualifying protocols may operate over TCP, UDP, or any other unicast transport. A connection that carries a qualifying protocol is called a "qualifying connection". An "interesting" connection is one that has been classified as anything that should receive non-default service treatment. Qualifying protocols may transfer a batch of files together. A "file" includes all files that are transferred together using a single content ID. A file transfer may take place over one or multiple concurrent connections. If the connections belonging to a transfer receive non-default service treatment then the transfer is an "interesting" transfer.

BitTorrent

BitTorrent is a widely-used peer-to-peer protocol designed for file sharing. The BitTorrent context exhibits several properties that improve the feasibility of service differentiation, including the following:

6) BitTorrent transfers begin with a globally unique identifier that can be used to unambiguously determine the content being transferred;
7) BitTorrent flows are large, and thus statistical methods with low sampling rates are likely to catch offenders;
8) BitTorrent traffic is forgiving, unlike telephony, which requires strict delay requirements;
9) BitTorrent-transferred content is not dynamically generated, and thus random subsets or hashes of the content can be known ahead of time and used to verify content;
10) BitTorrent transfers occur across many simultaneous connections, and thus a single randomly-chosen connection can be used to infer properties of other connections transferring the same content; and
11) popular content comprises the vast majority of BitTorrent traffic, improving the effectiveness of caching the results of content-specific queries related to QoS.

To distribute files over the Internet, a traditional method has been to place the file on a server and then end-users download the file in its entirety from that server. Services like Napster popularized a starkly different paradigm: peer-to-peer file sharing. With peer-to-peer file sharing, end-users cooperate by forwarding files between themselves. Napster and later peer-to-peer file sharing systems Gnutella and FastTrack do not provide an incentive for users to contribute upstream bandwidth. BitTorrent improved on prior peer-to-peer file sharing systems by introducing the notion of tit-for-tat: each peer sends to those peers that send the fastest to it.

With BitTorrent, a peer joins a swarm of peers wishing to download the same file or download the same batch of files. A file or batch of files so delivered is known as a torrent. The connections engaged in transferring pieces of the same torrent are said to belong to that torrent.

To join a torrent, a peer first contacts either a tracker or a Distributed Hash Table (DHT) to obtain the network addresses of a subset of peers already belonging to the torrent. The tracker is a server that maintains a registry of all peers belonging to the torrent. A Distributed Hash Table (DHT) is a decentralized data structure spanning the peers, and which supports the basic operations of a classical hash table. The DHT maps from infohash onto the addresses of peers belonging to the corresponding torrent. Once the peer obtains a set of peer addresses, it opens connections to these peers and begins trading pieces.

BitTorrent thus comprises three protocols: peer-to-tracker, DHT, and peer-to-peer. When appropriate, we distinguish between these protocols; otherwise, "BitTorrent" refers to this collection of protocols.

Integration With Other Service Differentiation Architectures

In one embodiment, the present invention can be used in the context of prior qos architectures as a means of classifying traffic and mapping it onto a particular service treatment, and then later verifying that the traffic actually carries the claimed content. In the case of ATM this includes mapping the packet onto a given virtual circuit. In the case of DiffServ, classification steers packets to the appropriate traffic conditioning components in an edge router.

Figure 2:
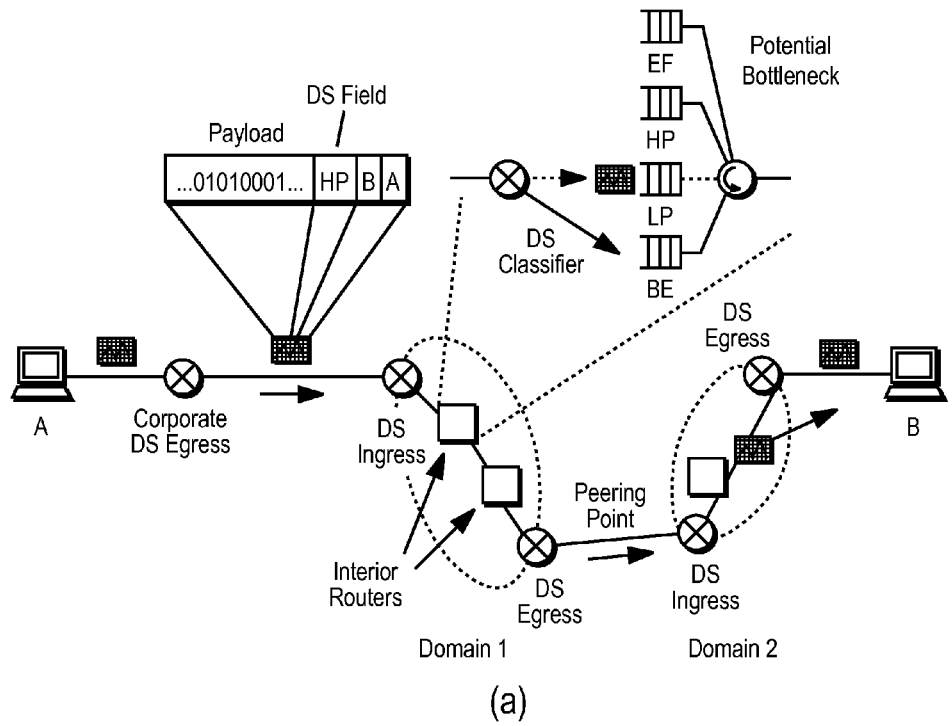
FIG. 2a illustrates a DiffServ environment augmented to use content classification in accordance with an embodiment of the present invention.
FIG. 2b illustrates building blocks of an edge router including a content classifier in accordance with an embodiment of the present invention.
Figure 2:
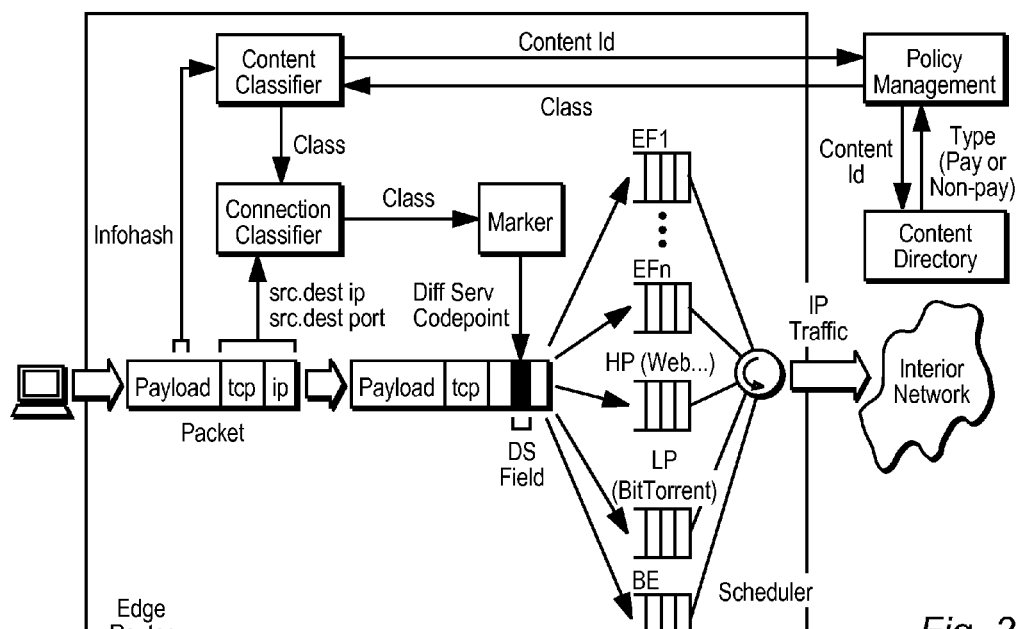

As an example, with DiffServ, the content classifier described further below is in one embodiment used in edge routers. As illustrated in FIG. 2 the ISP then accesses a content directory to distinguish different types of content (e.g., pay versus non-pay). The lookup optionally includes the initiating user's IP address to ensure that the user has purchased the content. The response from the directory is given to a policy management component that determines the appropriate class of service. The class of service determines the set of traffic conditioners applied to the packets. In the network interior, the ISP can implement any number of traffic classes for voice, interactive data, bulk pay-content, bulk and non-pay content. A wide variety of sophisticated schedulers can be used to prevent starvation or provide service guarantees, e.g., WFQ, hierarchical link sharing, RCSP. However service guarantees would only apply to the file sharing traffic as an aggregate. Any user could experience degraded performance, especially if an attacker presents false content IDs to consume resources from the higher precedence BitTorrent queue. Using one of the verification methods described below, the user's infraction is eventually detected. Once detected, the ISP is free to penalize the attacker by any number of means: the user could be blocked entirely, placed in a penalty box, or the infraction could be elevated to a network manager for human intervention.

FIG. 2 illustrates an embodiment of the present invention in which DiffSerrve is augmented to use content classification. Assume that the qualifying protocol is BitTorrent's peer-to-peer protocol, and that there are only two types of content: pay and non-pay. In FIG. 2a, the bottleneck differentiates between more classes. A Higher Precedence (HP) class handles delay and loss sensitive data traffic like web traffic, a Lower Precedence (LP) class is for traffic to which BitTorrent connections carrying pay-content have been directed, and an even lower precedence best Effort (BE) class for everything else. A content classifier is added to the edge router in FIG. 2b. As described further below, this component extracts the info-hash at the beginning of a connection and consults the service provider's policy management system, which in turn consults a content directory to determine the appropriate traffic class for different types of BitTorrent traffic.

Alternatively, an end-system could download the correct content, but not adhere to TCP congestion control, thereby starving TCP-compliant connections out of the bottleneck and potentially causing congestion collapse. However, such blatant attacks can usually be contained with additional mechanisms at potential bottlenecks, or with denial of service/network intrusion detection mechanisms in the edge routers. The verification engine acts as a network intrusion detection system.

BServ: Basic Service Differentiation

In one embodiment, the present invention operates using edge routers, without any other QoS building blocks inside the network. We refer to this configuration as "Basic Service Differentiation" (BServ). With BServ, when content is classified as more important, it is given incrementally improved performance, e.g., by imposing a less stringent static rate limit than for default BitTorrent traffic (as shown in FIG. 2). By tuning the rate limits, the ISP can protect its more fragile traffic from qualifying traffic while providing improved performance for pay content.

Integration with DiffServ provides an advantage over BServ in that with DiffServ, BitTorrent or any file transfer using a qualifying protocol can be allowed to consume all excess capacity without harming other traffic.

Figure 3:
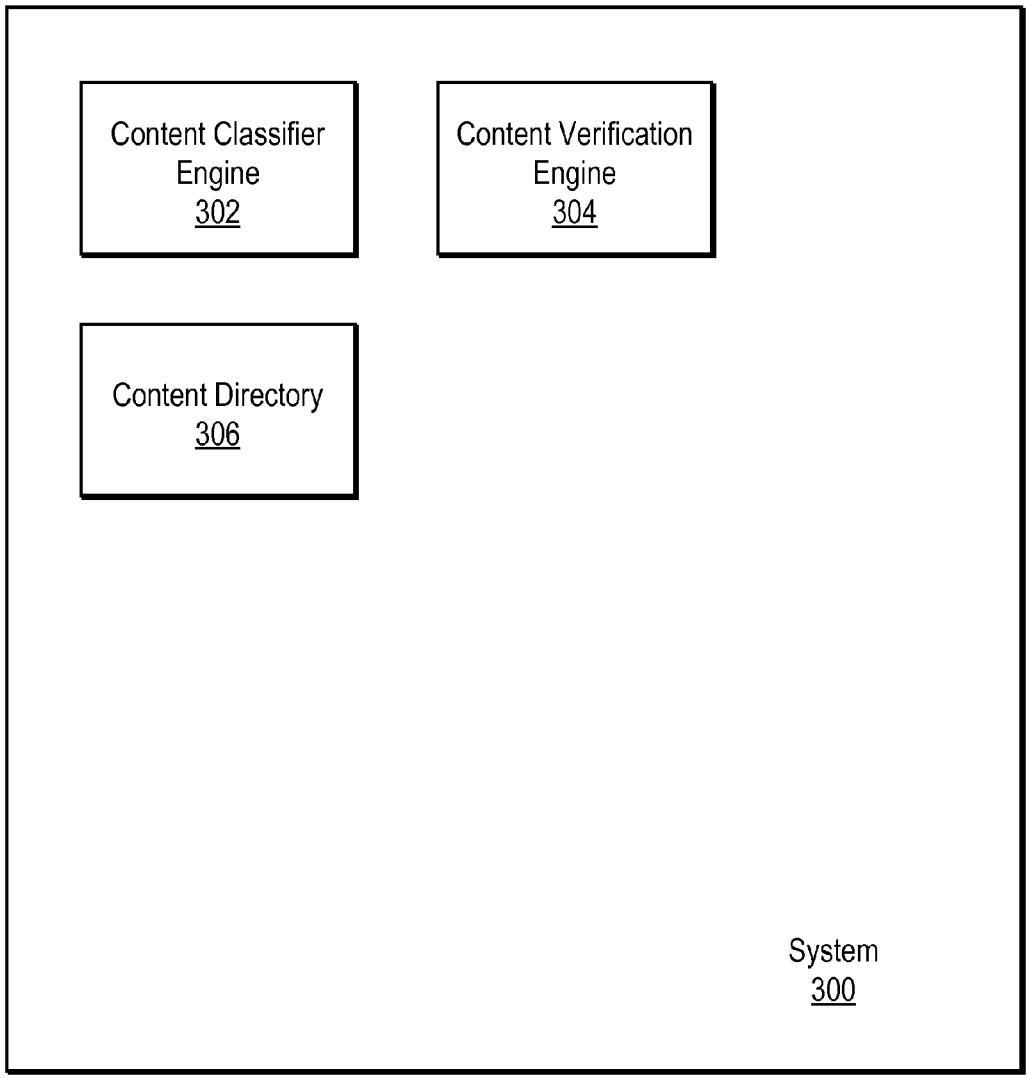
FIG. 3 illustrates a system for classification and verification of content in accordance with an embodiment of the present invention.

A system in accordance with an embodiment of the present invention is illustrated in FIG. 3. System 300 includes a content classifier engine 302, a content verification engine 304, and a content directory 306. Each is described further below.

Content Classification

We first consider classification specific to BitTorrent.

When BitTorrent opens a peer-to-peer connection, it begins with a handshake. This handshake starts with character nineteen followed by the string "BitTorrent protocol," then an 8-byte options field, and then a 20-byte infohash. The infohash is a cryptographically secure, collision-resistant hash of two things: the hashes of each piece of the content about to be transferred and certain metainformation including proposed filename(s) and file length(s). Because all fields in the handshake have fixed length and fixed order, determining the infohash is simply extracting the 20 bytes starting from the 29th byte into the TCP stream. By convention BitTorrent uses the SHA-1 hash function. The initial exchange and extraction of the infohash is illustrated in FIG. 4.

Figure 4:
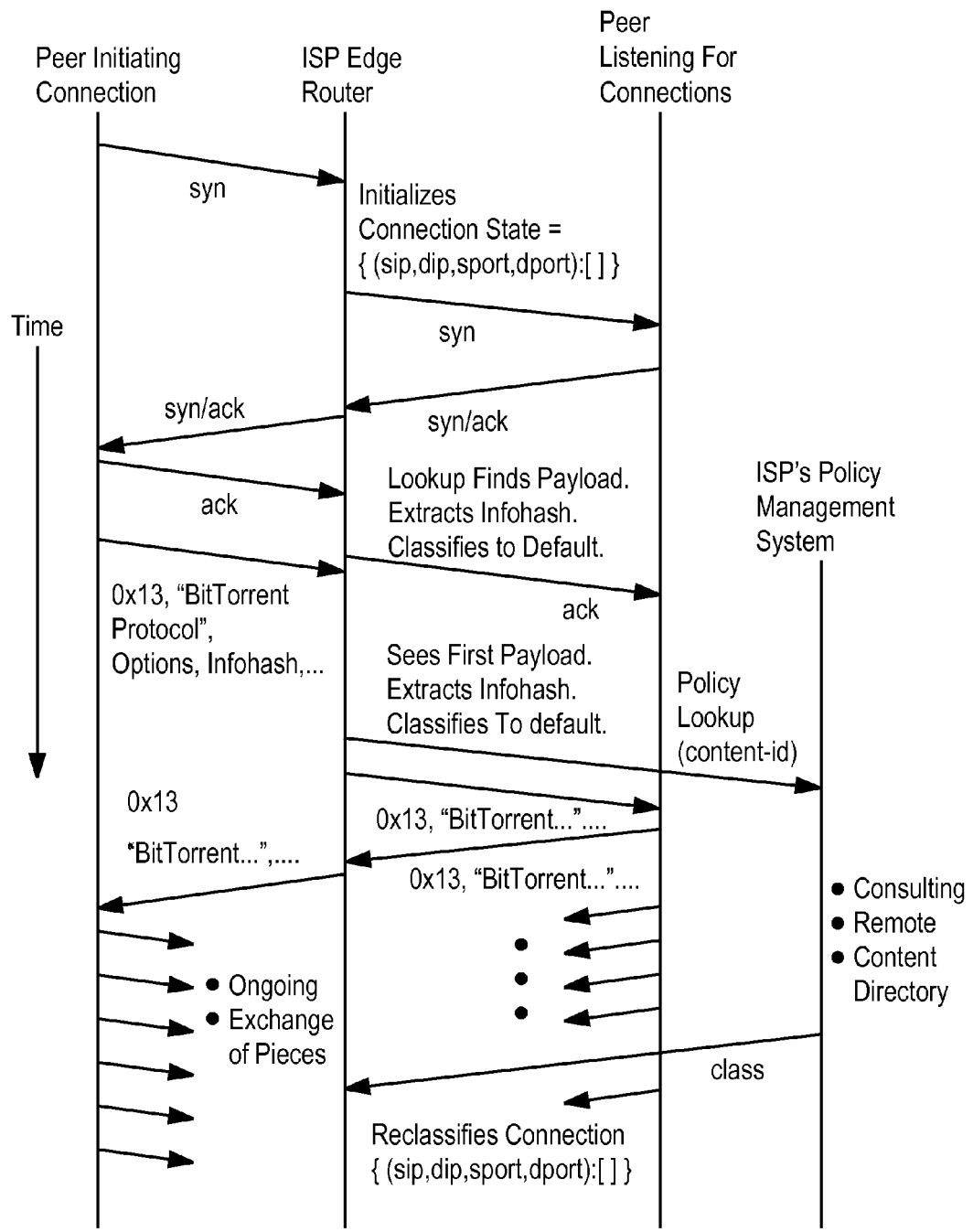
FIG. 4 is a time line illustrating initiation of a TCP connection and treatment of packets by an edge router in accordance with an embodiment of the present invention.

The time-line of FIG. 4 illustrates a peer initiating a TCP connection to carry BitTorrent traffic and how these packets are treated by an intervening edge router. TCP uses a three-way handshake, here labeled SYN, SYN/ACK, and ACK. SYN refers to the "synchronize" bit in the TCP header, and ACK as an acknowledgement to a previously received packet bearing a given sequence number. From the addresses and ports in the SYN, the edge router can often correctly guess that the connection will use BitTorrent, but not the content of that transfer. When the edge sees a SYN, it merely notes that a connection is beginning and starts looking for the first data-bearing packet. With T/TCP, the SYN packet itself can carry data. Although not supported by the application-layer programming interface to most TCP implementations, the last ACK in the three-way handshake can also carry data. Regardless, the first data carrying packet can be determined by looking at the packet header's IP packet length and TCP data offset fields. The infohash is read from this packet which triggers a policy lookup to determine the appropriate QoS for that connection. In FIG. 4, resolution of the policy lookup takes significant time, during which the router can optionally forward packets for the connection using the default QoS for BitTorrent traffic.

Due to the length of the hash, the probability of any two pieces of content having the same hash is very small. Thus, the infohash can be used to identify the content for purposes of connection-level classification in QoS systems. We call this "infohash classification".

For practical purposes, the entire infohash is not necessary for classification. In one embodiment, content classifier engine 302 can use any sufficiently long subset of the bits. Subsets of bits can also be combined so long as care is taken to preserve adequate entropy. The desired entropy is considered an input parameter to the system. For example, assume that an operation is performed that preserves entropy in the sense that the result has entropy no worse than the entropy of the operand with least entropy. If every bit in the hash has equal probability of either being a 0 or 1 across the set of possible hash function inputs, the final entropy of k bits computed by combining bits using only entropy-preserving operations will be no worse than the entropy of any k bits randomly chosen from the hash and thus all such k bits are equally good for purposes of content identification.

Content classifier engine 302 in one embodiment classifies content once per connection. The result of this classification is then cached for the duration of the connection by the connection classifier engine in its connection table. The connection classifier engine then maps all packets with the same source and destination IP addresses and source and destination TCP ports onto the cached class. Upon seeing a packet in the connection with its TCP FIN bit set, connection classifier engine eliminates the connection state. The connection classifier may also timeout the connection if the connection is inactive for a long period, for example significantly longer than BitTorrent's keep-alive interval of 120 seconds. Should the edge-router lose state while a connection is still alive, such as due to a reboot or a premature timeout, the edge-router can map the connection on to the default QoS treatment for BitTorrent or best effort traffic for the remainder of the connection.

Because all connections belonging to a torrent begin with the same infohash, a classifier need only perform one policy lookup per burst of TCP connection opens, thus avoiding stress on content classifier engine 302 that would result from performing a policy lookup on each connection in a short space of time. Furthermore, a router can default classify the packets belonging to the connections being classified until classification processing completes.

Content Classification with other Qualifying Protocols

Content classifier engine 302 can be used with any qualifying protocol. Using protocols other than BitTorrent, instead of extracting the infohash, the content classifier engine 302 extracts the globally unique content ID and then communicates this content ID or a sufficiently unique ID derived from the extracted ID, where sufficiently unique is based on the same entropy criterion used for content IDs derived from infohashes.

Application-Layer Content Classification

The operation of content classifier engine 302 as described is transparent to end-systems. Content classifier engine 302 operates in the network layer, i.e., below TCP on devices that have direct access to the flow of packets. In an alternative embodiment, the classifier engine 302 operates in an application-layer proxy, such that it operates above TCP at a connection end-point. One advantage of application-layer over network-layer content classification is that implementation does not require upgrading and complicating routers, and there is minimal or no impact on the performance of other traffic. In addition, implementation is made easier because TCP provides data only once, reliably, and in-order.

In one embodiment, system 300 uses a non-transparent type proxy. The non-transparent proxy requires modifying the behavior of peers, and may require modifying the qualifying protocol. It does not require modifying the BitTorrent protocols. In the context of BitTorrent, the non-transparent proxy can simply be treated as a cache using the caching extensions already proposed for the BitTorrent protocol. It is up to the ISP to provide service no worse than default for traffic directed through the proxy. This can be achieved by better provisioning the proxy, employing DiffServ, etc.

A semi-transparent proxy is so-named because it is transparent with respect to the BitTorrent peer-to-tracker protocol, but it is non-transparent to the BitTorrent peer-to-peer protocol. Unlike with non-transparent proxies, semi-transparent proxies require no modifications to peer behavior.

The semi-transparent, application-layer proxy of system 300 includes a tracker proxy, a peer-to-peer proxy, and a component that sits in the network layer in the path of packets to transparently intercept peer-to-tracker protocol traffic. The last component can be implemented using any one of a large number of widely available Network Address Translators (NATs).

Figure 5:
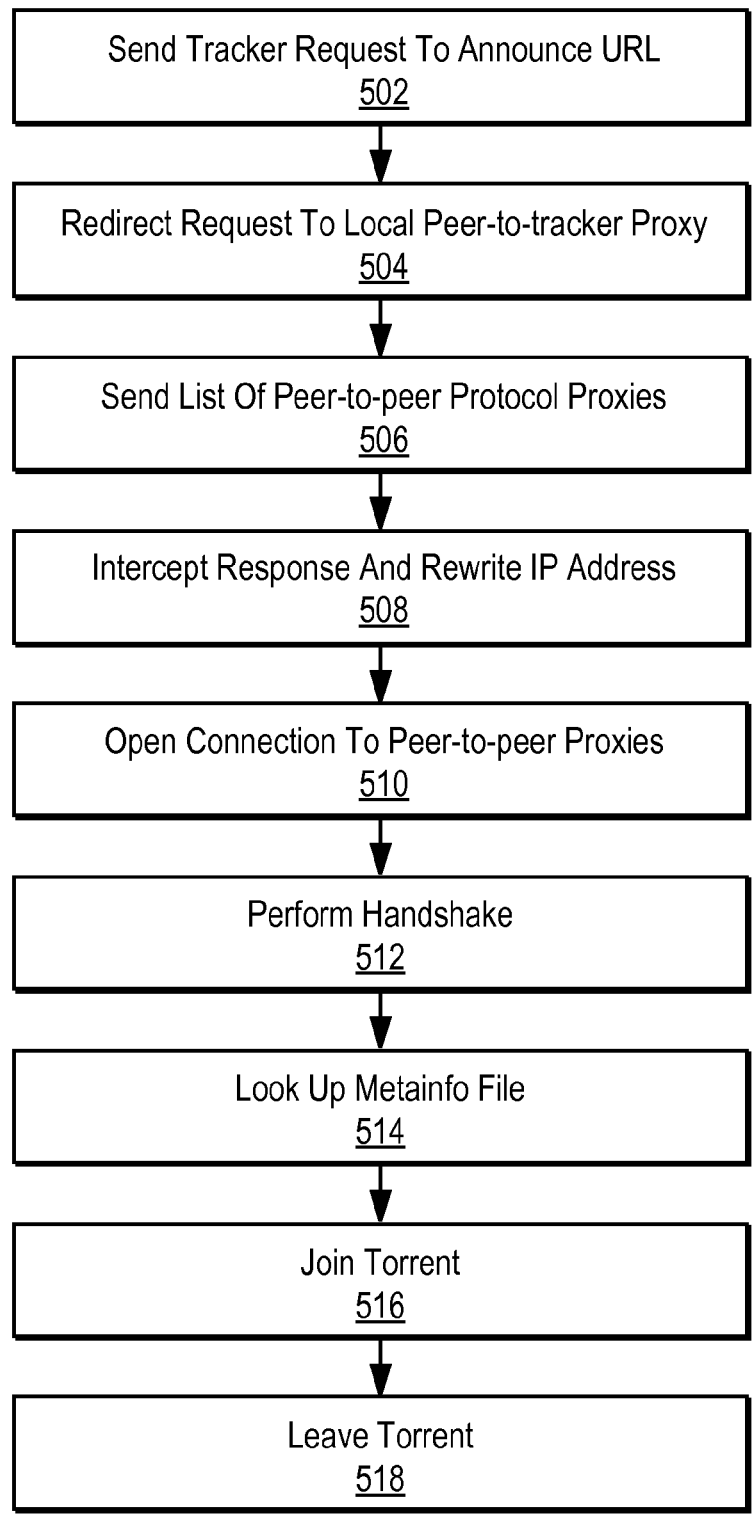
FIG. 5 illustrates a method for transparently intercepting peer-to-tracker communications to redirect further peer-to-peer communications using the BitTorrent protocol in accordance with an embodiment of the present invention.

For ease of description below, peers, proxies, and NATs belonging to a single organization or some portion of a service provider network are referred to as local, and all other network nodes are referred to as remote. The NATs sit in the paths of the local peers and rewrite destination addresses for all packets destined to a canonical tracker port (e.g., the tracker well-known port) so that these packets arrive at the local tracker protocol proxy. It is up to the tracker provider to use the mutually agreed upon port if he or she wants preferential treatment for his or her BitTorrent traffic. FIG. 5 illustrates a method for transparently intercepting peer-to-tracker communications to redirect further peer-to-peer communications using the BitTorrent protocol in accordance with an embodiment of the present invention. As illustrated in FIG. 5:

Peer p sends 502 a tracker request to announce URL x.

NAT intercepts all traffic to the canonical tracker port and redirects 504 it to local peer-to-tracker protocol proxy y.

y sends 506 tracker reply back top containing a list of one or more local peer-to-peer protocol proxies m1 ... mN.

The NAT intercepts the traffic heading from the tracker proxy to p and rewrites 508 the proxy's IP in the reply so that it appears to have come from x.

p opens 510 connections to one or more of the local peer-to-peer proxies oblivious to the fact that they are proxies.

Each of the proxies in m1 ... mN that receive a connection open from p perform 512 the standard Bit-Torrent handshake and thus receive the content's infohash.

The peer-to-peer protocol proxy performs 514 a lookup into the content directory or the DHT (as with Azureus magnet links) to obtain the torrent's metainfo file. If p enables the BitTorrent cache extensions, y can also request the metainfo file directly from the peer.

Upon receiving the metaininfo file, the proxy joins 516 the torrent.

Once all local peers have left the torrent, the proxy leaves 518 the torrent.

As with non-transparent proxies, it is up to the service provider to ensure that traffic passing through the proxy receives service no worse than default; otherwise, trackers will begin using non-canonical port numbers.

Content Verification

System 300 initially trusts that the content ID presented near the beginning of a connection is correct. However, users may attempt to take advantage of this trust. For example, a user could install a variant of the file transfer protocol that presents content IDs of content known to receive preferential QoS treatment and then the user could transfer (i.e., smuggle) unrelated data. When a user smuggles unrelated content in a qualifying file transfer, the user is said to have committed an infraction. Content verification engine 304 detects infractions with high or tunable probability. Once detected, it is up to the service provider to apply a commensurate response.

The verification problem can be decomposed along a number of dimensions: network layer vs. application layer; transparent vs. semi-transparent vs. non-transparent; all content vs. content sampling; pieces vs. bytes; random single, subset, or all connections; and online vs. offline.

Application-layer verifiers can be positioned in the same transparent and semi-transparent application-layer proxies as content classifiers as described above. Application-layer verification has the same advantages as application-layer classification. Transparent verifiers preferably reside in the network layer.

An all-connections, all-pieces, non-transparent verifying proxy has the most straightforward implementation and is the quickest to detect infractions, but it is also computationally expensive. The proxy watches all interesting connections passing through content verification engine 304 from beginning to end and verifies that each piece transferred is valid. We proceed through a series of refinements to reduce computational complexity at the expense of increasing the time until an infraction is detected.

All Connections, All Pieces

In one embodiment, content verification engine 304 uses an all-connections, all-pieces verification method, which works with any qualifying protocol. The qualifying protocol may further group consecutive blocks into pieces, as does BitTorrent. For protocols that do not use pieces, the block can be considered a degenerate piece, i.e., a piece composed of only one block. This verification can be implemented in the network or application-layer. For purposes of illustration, we use BitTorrent for the presentation of the all-connections, all-pieces embodiment.

All integers in the BitTorrent peer-to-peer protocol are 4-bytes big endian, except for the port message, which uses a 2-byte big-endian short integer to denote a port number. Every message in the BitTorrent protocol starts with an integer "len" denoting the message's length followed by an opcode op denoting message type. Every piece message has opcode 0x07 and has the following format:

<len><op=0x07><index><off><data>

"index" and "off" are integers. Every piece has an essentially unique index. Since a single piece may have length that is too long to efficiently send as a single message, pieces are further divided into blocks, also known as slices or chunks. The "off" field denotes the byte offset of the beginning of the block within a piece. The data field contains the block.

Once all bytes in a piece message have been read from a stream for an application-layer verifier, or once all packets in a message have been captured, ordered, and their payloads extracted, content verification engine 304 buffers the block and waits for other blocks to arrive. Once all blocks in a piece have been assembled, content verification engine 304 determines a hash across all bytes in the piece using a secure hash function such as SHA-1.

With BitTorrent, the hashes of all the pieces are included in the torrent's metainfo file. Content verification engine 304 can cache a set of metainfo files, or it can cache any subset of each metainfo file containing the piece hashes. When the content verification engine 304 does not have the piece hashes for a given infohash, it can retrieve the piece hashes from the BitTorrent DHT as with Azureus magnet links or by retrieving them from content directory 306.

For other qualifying protocols, the piece hashes can be communicated ahead-of-time by any external means, for example by downloading a hash file from a trusted server.

Since hashes do not change for static files, content verification engine 304 can cache hashes indefinitely or as is dictated by any conventional cache replacement algorithm.

If a hash check on any piece fails then an infraction has occurred.

Content Sampling

The computational complexity of the all-connections, all pieces method can be reduced through sampling. Content verification engine 304 can hash a subset of the pieces and declare an infraction if any hash check fails. The computational cost scales proportionally to the size of the subset hashed, as does the probability of detecting a single infraction.

The sampling technique should preferably not allow peers to infer what subset of the data will be used for verification purposes. Should such an inference be made, a peer could smuggle data in unsampled traffic without detection. Such attacks are called sampler attacks.

For example, assume the service provider responds to each infraction by blocking all connections transferring the content in which the infraction occurred that are from the peer committing the infraction. Also assume that content verification engine 304 samples every kth piece starting from a specified offset $\phi$, and the same k is used for all transfers. The sampler attacker starts a number of transfers and smuggles with a different frequency and offset on each transfer. Content verification engine 304 quickly catches all of the smuggling transfers except the ones with the correct k and any offset not equal to cp. The attacker observes which transfers are not blocked and then proceeds to smuggle from that point onward using the inferred k and an offset other than $\phi$.

To prevent the attacker from inferring which packets are likely to be sampled requires only that every piece has equal probability of being sampled. In one embodiment, samples are chosen according to a Poisson process. To do this, content verification engine 304 obtains a random subset of the piece hashes with the number of pieces chosen also being random and obeying a binomial distribution, with parameter p denoting the probability of any given piece being chosen. We call this a binomial hash method.

If content verification engine 304 identifies a fixed positive number of piece hashes, then the memory requirement per transfer is fixed and guaranteed to be non-zero. However, if the attacker had some way of inferring how many piece hashes were already checked then the attacker could smuggle without detection after the last hash check. In practice, the attacker has no way of knowing how many pieces have been hash checked and thus a fixed number k of pieces hashes drawn randomly from the set of pieces is adequate. We call this a k-random hash method.

Hashing Pieces vs Matching Random Bit-Strings

The description above assumes that content verification engine 304 samples pieces. The computational complexity can be reduced by avoiding hash checks and instead sample bits or bit-strings. For any qualifying protocol, from any message containing a block, the byte offset of a given bit with respect to the beginning of the file can be uniquely determined. A random-bit verifier obtains a subset of bit values from some external means, for example downloading the content's bit-strings from a secure trusted server. Content verification engine 304 then waits for the capture of a block that contains one of these known bit values. If the bit in the captured block does not match, then content verification engine 304 determines that an infraction has occurred.

Content verification engine 304 may not be able, depending on implementation, to store in fast memory a significant number of bits for each of the concurrent interesting transfers. For each bit sampled, the verifier must know the bit's offset within the file. BitTorrent requires knowing the piece index, the byte offset, and then the offset within that byte: at least 9 bytes are wasted for each bit sampled. If we instead sampled bit-strings of length m we could divide the overhead over the m bits.

To avoid sampler attacks, the bit strings known by content verification engine 304 are preferably selected randomly from the file such that every bit in the file has equal probability of appearing in one of the content verification engine's known bit strings. As with the binomial hash method described above, for the distance between bit strings used in verification to be completely memory-less, the offset of each bit string is preferably drawn from a uniform random variable with range spanning [0, file length) and the number of bit strings should preferably obey a binomial random variable. We call this the binomial m-bit-string method. Analogously we refer to using a fixed number of bit strings drawn randomly across the entire file as the k-random m-bit-string method.

Aligning bit-strings to byte boundaries often reduces computation requirements and negligibly affects the probability of any given bit appearing in a bit-string, provided the bit-string length is at least one byte and much shorter than the file length. More generally, bit-strings can be aligned to boundaries that are any fixed, arbitrary number of bits d apart provided m>d. To avoid further needless computation, m is preferably an integer multiple of d.

We call this the d-bit-aligned k-random m-bit-string method, which accepts the number of bit strings k, the length of bit strings m, and the distance between alignment boundaries d as input parameters. The byte-aligned version includes the case when d=8, and the unaligned version includes the case when d=1.

Single-Connection and Subset-of-Connections

In one embodiment, and for any qualifying protocol that transfers a file across multiple concurrent connections, a subset S of connections or a single connection can be used for verification purposes. Connection sampling is the act of choosing the subset of connections that are monitored by content verification engine 304. Whether a verifier uses connection sampling is orthogonal to prior mentioned issues: connection sampling verifiers can operate in the network- or application-layer and can hash pieces, match bits, or match bit-strings.

By observing each connection in S from beginning-to-end, the boundaries of messages in any message-based transfer protocol can be determined from prior state; otherwise, the destination network node would not always be able to parse messages. This is not the case if we observe a connection already in progress, which leads us to consider synchronization issues below. For now we assume all connections are watched from beginning to end and that connection rerouting does not frequently cause connections to migrate onto a network path that excludes content verification engine 304. When content verification engine 304 sits in the application layer, rerouting is not an issue and connections are always watched from beginning-to-end.

The selection of which connections to verify is preferably random. If all connections have a chance of being watched, then a peer cannot smuggle without possible detection. However, not all connections start at the same time. If system 300 were to pick one from the first k connections for any given peer transferring content, then the peer could smuggle in any connections after the kth without detection.

As with content sampling, if connections are chosen each with equal probability p, then no information is leaked to the user that can be exploited to reduce the probability of detection. We call this the binomial connection-sampling method, since the number of connections sampled obeys a binomial random variable.

Unlike file length, the exact number of connections that will pass through content verification engine 304 for any given content is not knowable ahead-of-time. However, a first-k binomial connection-sampling method guarantees that the first k connections are monitored, and then connections are chosen randomly with equal probability thereafter.

When a monitored connection ends, there is the possibility that no other connections remain and that are currently being monitored. A at-least-k binomial connection-sampling method is used in one embodiment to always monitor the next connection to open if content verification engine 304 is monitoring k or fewer connections and monitors new connections with equal probability thereafter.

In practice, either the total state or the amount of state per file transfer must be bounded. However, with such a bound, an attacker need only open a large number of connections so that the state bound is reached and then the attacker can smuggle without detection on any further open connections. If the requirements are relaxed so that connections do not have to be watched to the end then this problem can be eliminated. With the k-binomial connection-sampling method, content verification engine 304 monitors the next connection to open if content verification engine 304 is monitoring k or fewer connections and monitors new connections with equal probability p thereafter; however, when it monitors a new connection and there are k already being monitored, it randomly stops monitoring one connection. k-binomial connection-sampling also generalizes in a straightforward manner to require at least k but no more than q.

Connection Preemption

An attacker can arbitrarily reduce the probability of detection by increasing the number of connections and then transferring on only one or a small number of those connections. With many qualifying protocols, including BitTorrent, when a connection is first opened, which connections will transfer the most data is unknowable. We use connection preemption as a term to describe forcibly closing connections to maintain a bounded number of open connections for which state is maintained, and connection switching to mean stopping monitoring of one connection and starting monitoring of another connection that may already be in progress.

Connection preemption is useful when content verification engine 304 maintains state for every connection. Such a verifier can maintain just enough state to maintain synchronization on message boundaries, thus eliminating much of the complexity associated with connection switching.

When a new connection opens, if the connection table is full content verification engine 304 in one embodiment picks a connection and terminates it. A network-layer verifier can terminate a connection by sending a TCP segment to each end of the connection with the reset bit set. An application-layer verifier closes the connection.

Connection preemption is a type of cache replacement, and many conventional cache replacement algorithms may be used, including Least-Recently Used (LRU), Least-Frequently Used (LFU), lowest-rate first, and random. Since a closed connection cannot be used to transfer further data, it cannot present a threat to system 300, thus any replacement algorithm suffices, though certainly different replacement algorithms will result in different overall performance.

Connection Switching

To perform verification on highly aggregated traffic, methods are desirable that do not require per-connection state for all interesting connections, but such state cannot be completely eliminated: for TCP and UDP the connection-classifier must map from source-destination address-port 4-tuples or sockets on to service treatments. However, it is possible to reduce per-connection verification-specific state to just those connections being monitored, but in so doing content verification engine 304 must be able to peek in on connections that are already in progress. To monitor a connection already in progress requires synchronizing on message boundaries as discussed below.

We describe binomial busy period connection-sampling, first-k binomial busy-period connection-sampling, at-least-k binomial busy-period connection-sampling, and k-binomial busy-period connection-sampling methods, all similar to the algorithms described above, except that they trigger at the beginning of each busy-period in the same manner as the methods in those above trigger on connection opens.

In the case of BitTorrent, busy-period detection is a simpler problem than synchronization, because traffic during idle-periods contains only non-payload carrying messages, and assuming idle-period messages are small and infrequent, message boundaries likely coincide with segment boundaries. Furthermore, a false-positive only triggers the possibility of starting monitoring. If monitoring actually begins then a more accurate synchronization method is preferably employed.

In one embodiment, system 300 employs a busy-period detection method, as illustrated in FIG. 6.

This method avoids maintaining state beyond processing a single packet. In an alternative embodiment, an if statement can be included to verify that the opcode and length are valid, but this may not work with the variety of experimental extensions to the BitTorrent protocol. A compromise is to introduce an if statement after Line 13

```
14      if INVALID(op, len)
15          then return BUSY
16      return IDLE
``` that only checks whether messages with known opcodes have valid lengths as defined in the BitTorrent protocol specification. Messages containing opcodes interested, not interested, choke, and unchoke are 1 byte long, while have messages are 5 bytes.

The method of FIG. 6 could allow arbitrary messages of short length with unknown opcodes to pass unmolested. As a result, an attacker could smuggle data in small messages with non-standard opcodes. This danger can be reduced by setting thresh low, but it should be large enough to accommodate Nagle's algorithm. Because of the small size of BitTorrent messages other than piece messages, setting thresh to 20 bytes is sufficient in one embodiment.

To further limit potential damage from smuggling tiny-grams, the verifier can meter the rate on "idle" connections and determine them to be busy if the rate exceeds a threshold. Unlike with piece hashing and bitstring matching, rate metering does not require knowledge of message fields or boundaries, and thus can be applied during idle periods without first synchronizing on message boundaries.

In one embodiment, the rate meter(s) randomly switch between unmonitored connections after an exponentially-distributed period of time or, alternatively, after a geometrically-distributed number of packets. If counting packets, the count preferably includes packets from all unmonitored connections, not just the currently metered connection, so that a connection that sends more packets has a proportionally higher likelihood of being metered. To refer to methods that use rate meter(s), we append the string "with metering" to the names of the connection methods used above. In the embodiment in which connection switching occurs after exponentially distributed time, then content verification engine 304 is said to be using exponential metering. If connection switching occurs after a geometrically distributed number of packets then it is said to be using geometric metering. A k-binomial busy-period connection-sampling method with exponential metering and having mean time period τ between samples set high enough to allow many unchoke intervals, e.g., 5 minutes, is used in one embodiment.

Verification methods for catching tiny messages and unconventional-opcode smuggling are described further below.

Message Synchronization

Frame synchronization is a standard physical-layer problem in all communications systems. In the network and application layer, synchronizing on message boundaries is relevant to the current discussion. For an application layer verifier running on top of TCP, message synchronization is trivial in one embodiment, since all data is provided reliably, only-once, in-order and presented to the application as a byte-stream. All qualifying protocols either have pre-defined messages lengths according to message type or have length pre-fixed messages. Synchronization is a matter of advancing by the message-appropriate number of bytes in the byte stream, starting from the first byte received on the connection.

Network-layer verifiers sit below transport layer reordering and error detection mechanisms, and thus have to accommodate retransmits and erroneous payloads. Fortunately, only a small subset of the mechanisms present in the transport layer need to be replicated inside the network layer. At a minimum, TCP checksums should be verified before the TCP segments are passed to content verification engine 304.

FIG. 7 provides pseudocode for maintaining synchrony on message boundaries. The illustrated pseudocode will maintain synchrony, provided no bit errors are provided to content verification engine 304.

BitTorrent prefaces all messages with the message length. Thus, to maintain synchronization with BitTorrent, with each packet arrival, system 300 uses a per-connection counter r denoting the number of bytes remaining in the current message field. In addition to r, the synchronization method maintains the largest sequence number seen so far, maxseqno, and Boolean b, denoting whether to buffer received bytes until the next call to SYNC (FIG. 7).

In one embodiment, SYNC uses "yield" analogous to Python's yield: a call to SYNC returns a generator here named sync, every call to the generator sync calls the function body of SYNC, and every subsequent call to the generator continues execution from the prior yield. The arguments to yield are returned from the generator. The arguments to the generator's next call are returned from that same yield. The pseudocode of FIG. 7 can be rewritten with neither generators nor yield operations as follows: 1) move each block of code between yields into a separate function; 2) replace each yield with a return that returns a state id that identifies which function to call when the next segment arrives. The state id can be a function pointer. The use of generators allows for cleaner pseudocode.

The buffer buf in this pseudocode can be optimized by using a 4-byte integer, and appending using the appropriate bit shifting.

Statistical Synchronization

One drawback of maintaining synchronization state at all times is that it requires maintaining state for every interesting connection. An alternative is to resynchronize whenever content verification engine 304 starts monitoring a connection. With some qualifying protocols, resynchronization may be as simple as looking for a special synchronization bit string that otherwise does not appear in the byte stream. However, BitTorrent has no such bit string. We use the term statistical synchronization to refer to looking for bit patterns that with high probability correspond to a sequence of messages.

We now again consider the BitTorrent protocol, since the appropriate statistical synchronization method will vary between qualifying protocols. How well statistical synchronization works depends on the properties of the payload. If the file being transferred is a log of uncompressed, raw BitTorrent traffic then statistical synchronization errors will occur. For payloads with high entropy, such as compressed video, synchronization is easier. Assume that the file is a string of independent and identically distributed (iid) bits, where 0 and 1 appear with equal probability, i.e., the file has entropy equal to its length in bits. Actual compressed video has lower information density, for which we include a safety factor. We refer to this high entropy data as random data or random payloads.

The table in FIG. 8 illustrates valid BitTorrent messages.

We next describe an n-BitTorrent-synchronizer. It operates in much the same way as SYNC, except the n-BitTorrent-synchronizer maintains up to n SYNC2 generators running simultaneously. Each SYNC2 represents an attempt to align to message boundaries each starting from a different offset into the segment. The algorithm passes over the segment once for each SYNC2. As such, assuming n<m, the algorithm requires worst-case $O(m^2)$ time per segment with at most O(n) state where m is the size of the segment. $O(m^2)$ computations are required when every byte is considered as a potential message boundary and enough bytes are valid to reach the end of the segment, and enough generators fail such that the algorithm does not prematurely move to the next segment. The algorithm moves to the next segment prematurely if continuing to process this segment would require more than n concurrent generators. Given random payloads, the probability of finding failing alignments that succeed up to length x drops off exponentially with x and therefore the expected time complexity is O(m).

The n-BitTorrent-synchronizer assumes no prior per-connection state exists for this connection except whatever might be necessary for content classifier engine 302; however, content verification engine 304 preferably maintains per-connection state during the synchronization process and thereafter to maintain synchronization.

FIG. 9 provides pseudocode for handling segment arrivals to the statistical synchronization method n-BitTorrent-synchronizer in accordance with an embodiment of the present invention. In this embodiment, when system 300 first begins synchronizing on a connection, it creates a set containing synchronizer tuples. For efficiency the set can be implemented as a hash table or table either indexed by SYNC2 generators. In Line 2, the n-BitTorrent-synchronizer obtains metainfo regarding the torrent to which the connection belongs. Preferably, connections have already been classified according to infohash and thus it is possible for the n-BitTorrent-synchronizer to know the torrent's metainfo.

When a segment arrives, there may be multiple SYNC2 instances in S because messages may span segment boundaries. To simplify the synchronization code, we use ASSEMBLEBYTES (FIG. 10) to maintain the illusion of a byte stream by assembling fields of the desired width before passing them to SYNC2. If a field spans segment boundaries then ASSEMBLEBYTES returns with state saved in the tuple r, b, buf, sync, and this state resides in S between segment arrivals. When the next segment arrives, ASSEMBLEBYTES picks up where it left off based on the previously saved state.

FIG. 11 illustrates a method for performing statistical synchronization starting from a given index into a connection's byte stream in accordance with an embodiment of the present invention.

, SYNC2 either yields awaiting further bytes from ASSEMBLEBYTES or ends with an exception denoting success or failure.

Success in one embodiment occurs only when the number of valid bytes, i.e., those that align properly, reaches a threshold THRESH. If Sync2 is successful, it raises a SYNCHRONIZED exception, which is caught on Line 20 of FIG. 11. Once successfully synchronized, the simpler SYNC can maintain synchrony thereafter.

Failure occurs on the first byte that could not occur if the synchronizer were properly aligned. If Sync2 fails, it raises an INVALID exception, which is caught either on Line 9 or Line 17 of FIG. 11.

The pseudocode provided for Sync2 checks for proper syntax and then enforces a limited set of semantic constraints. For example, it makes sure that piece indices are not larger than the number of pieces in the torrent (see Lines 20, 26, and 38). It checks to make sure that lengths and offsets do not go beyond piece length (see Lines 28, 30, and 40). And it checks to make sure that piece messages do not carry payloads that go beyond piece length (see Line 43).

A subtlety in the pseudocode arises in deciding when to increment the counter of the number of valid bytes. Counting the number of valid bytes is a compromise to reduce computational and implementation complexity at the cost of taking a little longer to determine when a connection has achieved synchrony. Ideally, we would count the number of consecutive valid bits and only declare success when the probability of a false positive reaches a vanishingly small threshold. With enough information we could compute this exact conditional probability as follows:

$$P[\text{false positive}] = P[\neg \text{sync'd} | \text{says sync'd}] \quad (1)$$
$$= P[\neg \text{sync'd} | \text{valid bitstring}]$$

If we synchronize once a connection has been declared busy (see FIG. 6) then likely almost all of the bits are payload, causing Equation (1) to become $$P[\text{false positive}] \approx P[\text{valid bitstring} | \text{in random data}] \quad (2)$$

Because the synchronizer knows the torrent's metainfo, it can know not only what constitutes a syntactically valid message, but also what bit string contains valid piece length and offset fields. For example, there are 18 opcodes of which only 15 can appear in the steady state. So the possibility of any random byte being a valid opcode is $15/2^8$. If a torrent has 1015 pieces, then the probability of a valid piece index occurring in random data is $1015/2^{32}$. We could count the number of consecutive valid fields computing the probability of each valid field arising in random data. Since the bits in the random data are i.i.d., the probability of a sequence of valid fields arising is the product of the probabilities for each field being valid, $$P[\text{false positive}] \approx \prod_{i=1}^{|f|} P[f[i] \text{ is valid}]. \quad (3)$$

where f is a sequence of fields, f[i] is the random variable denoting the value extracted from the bitstring for the ith field. For all messages, f[0] is the length field, and except for keep-alives f[1] is the opcode.

Since BitTorrent is completely comprised of opcode, indices, length, offsets, and payload fields, using the observations above, we can derive the probability of any given valid bit string arising in random data from Product (3). We then declare synchronization only when Product (3) is below a threshold. SYNC2 uses the observations above, except that SYNC2 counts the number of valid bytes and normalizes away the division by $2^8$. We thus call SYNC2 the normalized n-BitTorrent synchronizer.

For example, in Line 8, valid is incremented by 4. This corresponds to $$\frac{1}{2^8}$$

for each byte since a random byte has only $$\frac{1}{2^8}$$

probability of being zero, $$P[f[0]] = \left(\frac{1}{2^8}\right)^{valid} = \frac{1}{2^8} * \frac{1}{2^8} * \frac{1}{2^8} * \frac{1}{2^8} = \frac{1}{2^{32}}. \quad (4)$$

In Line 15, valid is incremented by 5. This corresponds to a valid opcode and a valid 4-byte length field. Following the argument in Equation (4), this would correspond to a false positive probability of $$\frac{1}{2^{40}},$$

which is clearly incorrect since the probability of a valid opcode is not $$\frac{1}{2^8},$$

but rather $$\frac{15}{2^8}.$$

To fix the situation we could either explicitly take into account the probabilities for each byte in each field, or we can discretize the probabilities to 0, $\alpha$, or 1. All non-zero probabilities below $\alpha$ become $\alpha$. All probabilities above $\alpha$ become 1.

For each $i \in [1, |f|]$, for each byte $b \in f[i]$: if $P[b \text{ is valid}] > \alpha$ then treat the probability as if it were 1. If $P[b \text{ is valid}] < \alpha$ then treat the probability as if it were $\alpha$. The probability of encountering a zero for each byte in a keep-alive is Assume we set $\alpha >$ $$\frac{1}{2^8}$$

then the adjusted probability Z for f[0] for a keep-alive is $$Z = \alpha^4 \geq \left(\frac{1}{2^8}\right)^4 = P[f[0]] \quad (5)$$

The probability for a valid opcode is $$\frac{15}{2^8},$$

, and if $$\alpha \geq \frac{15}{2^8}$$

then for the sequence of fields <f[0], f[1]>, $$Z = \alpha^5 \geq \left(\frac{1}{2^8}\right)^4 \frac{15}{2^8} = P[f[0]]P[f[1]] \quad (6)$$

After reading the message length and opcode in a potential message, the Z in Equation (6) is an upper bound on the probability of a false positive. Throughout SYNC2, valid is incremented only when the probability of a match with a random byte is less than α. In Line 15, valid is incremented by 5 because the opcode and the bytes in the length field all have low probability of occurring in a random byte string.

More generally, $$Z = \alpha^{valid} \geq \prod_{i=1}^{|f|} P[f[i] \text{ is valid}] = P[\text{false positive}] \quad (7)$$

where valid=the number of bytes in the fields in f where for b∈f[i]: if P[b is valid]≦α.

α does not appear explicitly in SYNC2, but valid is only incremented in certain cases: bytes matching an opcode, bytes that should be zero, and bytes containing a valid message length. Incrementing for each byte that should be zero accounts for the Lines 3 through i8 in VALIDINDEX, Lines 3 through 8 in VALIDOFFSET, and Lines 3 through 8 in VALIDLENGTH.

The probability of a zero byte occurring in random data is 1/256. The probability of a random byte matching a valid opcode is 15/256. The probability of the last byte in the length field matching a given valid opcode for a fixed-length message is 1/256. Thus α is 15/256≈0.059, and $$P[\text{false positive}] \leq 0.059^{valid} \quad (8)$$

We tune the false positive rate by setting the value valid must reach before declaring synchrony (see Line 2 in FIG. 11). A false positive indication of synchrony likely results in content verification engine 304 incorrectly identifying a series of infractions, potentially incurring penalties on the falsely accused user. Thus we want negligible false positive rates.

If we only deal with files less than 2 GB, users download less than $2^{10}$ files per month, and we want to falsely accuse the user of an infraction no more than once per 100 years then we should have a false positive probability per byte of no more than approximately $2^{-52}$. Thus, $$0.059^{valid} \leq \frac{1}{2^{52}}, \quad (9)$$

valid ≥ 12.74 bytes.

Thus THRESH should be at least 13 bytes, but because the underlying data might not be i.i.d. random 0's and 1's and because false positives may arise within improperly aligned messages and not just in random data, we suggest doubling the threshold to 26 bytes, i.e., a true positive indication of synchrony requires no more than 6 BitTorrent messages.

Simplifications of SYNC2

In SYNC2 (FIG. 11) the calls to VALIDINDEX on Lines 20, 26, and 38; calls to VALIDLENGTH on Lines 30 and 36; and calls to and VALIDOFFSET on Lines 28 and 40 may be omitted and the appropriate yield operations merged without requiring further modifications to the pseudocode or requiring changing THRESH. By removing such checks, SYNC2 no longer needs to know metainformation about the torrent. This modified SYNC2 achieves the same bound on the probability of a false positive but requires reading more bytes before declaring synchrony.

Steganographic Attacks

Steganography is the science of communicating via hidden messages. All of the smuggling attacks described herein could be considered steganographic attacks, though for the purposes of this section, we are referring to more subtle modifications to the qualifying protocol. Steganographic attacks could be as seemingly harmless as reordering messages, but in such a way that does not violate the semantics of the protocol, or by introducing valid but otherwise superfluous messages and using the count of such messages to carry information. Even a verifier that enforces all syntax and semantics of a qualifying protocol would continue unaware.

If content verification engine 304 does not enforce the entire syntax and semantics of the qualifying protocol, subtle high bit-rate attacks may go undetected unless explicitly addressed. Such attacks are likely protocol-specific, so for illustration we consider them for the BitTorrent protocol. The list of potential attacks is not meant to be exhaustive. We assume content verification engine 304 is using one of the aforementioned methods for detecting invalid piece messages.

Problem: Attacker uses invalid syntax to smuggle.

Solution: Once content verification engine 304 has synchronized on a connection, it can declare infractions for any message that does not a have a valid opcode and valid length as defined in Table 1 (FIG. 8). Content verification engine 304 can also declare infractions whenever a block length field or block payload length exceeds $2^{17}$ as bounded in BitTorrent specification v1.0. In the absence of further semantic knowledge such as the number of pieces in a particular torrent or what is considered a reasonable quantity of messages of a given type, no other violations can be caught. Other verification building blocks handle errors that require more semantic knowledge. FIG. 12 illustrates pseudocode for validating index, offset and length message fields.

If content verification engine 304 were so restrictive as to declare infractions for any opcodes not listed in the table then any extensions to the BitTorrent protocol would require redeploying verifiers. Instead in one embodiment we suggest only enforcing the length field for known opcodes. This is called known-syntax verification. The pseudocode is shown in FIG. 14.

Problem: Attacker uses valid syntax, but uses invalid ranges for fields.

Solution: Content verification engine 304 can know the number of pieces in the file, the piece length, and the upper bound on valid block sizes. If any field contains values larger than the corresponding bound, then content verification engine 304 declares an infraction. This is known as range verification.

Problem: Attacker uses metainfo M messages to carry arbitrarily large pieces of unrelated data.

Solution: allow only one metainfo message per connection, or allow only one per monitoring period if content verification engine 304 monitors only a subset of the connections at a time. This is called the allow-only-one-metainfo method.

Problem: Attacker uses invalid opcodes with valid length fields to carry arbitrary data, Solution: allow only valid opcodes, but then content verification engine 304 may generate false positives when a connection uses valid new or experimental protocol extensions.

Another solution: allow any opcode, but require messages other than piece and metainfo messages to be smaller than a certain size, e.g., no more than 32 bytes. Content verification engine 304 may still fail when dealing with new or experimental protocol extensions, but this solution assumes it is unlikely that future valid extensions will include messages with large payloads.

Problem: Attacker uses many tiny messages with valid or invalid opcodes and valid length fields to carry arbitrary data.

Solution: allow no more than a constant factor more tiny messages than request plus have messages in the same connection carrying the tiny messages.

The first solution to smuggling many tiny messages assumes that any protocol extension is likely to generate fewer messages than request or have messages. request, have and piece messages are sent more frequently than any other message in the BitTorrent protocol. A constraint can thus be applied on all other opcodes known or unknown based on these three. Several requests are sent for every piece, one piece message is sent for every request, and a have is sent to every peer for every piece completely received. If tiny messages are bounded at 32 bytes each, if blocks are each at least $2^{13}$ bytes as suggested for at-most-n-below-conventional-minsize (described below), and if we allow no more tiny messages, than requests plus haves then piece messages will comprise at least 256 times more bytes than the smuggled tiny messages. If we include a safety factor of two, undetectable smuggling in tiny messages represents less than 1% overhead. To allow for some bursts of messages that are not piece or request messages, system 300 in one embodiment uses a token-bucket that starts with a count of $cnt_0=10$. The token bucket count increments for each have or request message sent in a connection in a given direction and decrements for each message of any other type except piece messages sent in the same connection in the same direction. To allow for a wide variation in burst sizes without allowing smuggling to consume more than a small fraction of the traffic, we suggest setting the maximum depth of the token bucket σ to ∞, e.g., $σ=2^{32}-1$ for a 32-bit token counter. σ is enforced only to prevent roll-over.

If an observed connection goes outside the allowed constraints then an infraction is declared.

By ensuring at least 99% of the traffic is content bytes in piece messages and then verifying piece messages, we ensure that almost any undetectable steganographic attack comprises a minuscule fraction of the bitrate. We call the method for bounding tiny message size and number as antiny, standing for anti-many-tiny. Known-syntax, range, antiny and allow-only-one-metainfo verification methods can be combined with any of the verification methods presented in this disclosure.

Steganographic Attacks on Piece, Have, and Request Messages

Almost any steganographic attack can be limited using antiny, except for those attacks based on the three messages types that are exempted from the constraint on their quantity: piece, have, and request messages. The content of piece messages must be valid to continue indefinitely when faced with hash checking or random byte-sampling verifiers. However, the quantity and size of piece messages can be manipulated to carry information. To send a significant amount of information based on the quantity, order, or length of messages requires sending many messages. Increasing the number of messages for a given bandwidth requires sending smaller messages. BitTorrent clients send piece messages with fixed length blocks except possibly for the last block in a file. Content verification engine 304 can thus record the block size across k piece messages at the beginning of any observation interval and remember the largest. k may be as small as two or three. From that point onward, in one embodiment, content verification engine 304 allows n deviations from the max block size. When n is exceeded, content verification engine 304 declares an infraction. n also can be as small as five. This is the at-most-n-below-observed-maxsize method.

With the size of piece messages constrained, the quantity and order of piece messages can still be manipulated. If the attacker always sends small blocks then the maximum seen so far is still small. However, the BitTorrent protocol suggests piece sizes around $2^{15}$, and the current mainline implementation uses $2^{14}$. All known BitTorrent implementations use at least $2^{14}$. Thus we can impose an at-most-n-below-conventional-minsize, where minsize is typically be set at $2^{13}$ or $2^{14}$ and n as small as five. Assume an attacker with uplink capacity c wishes to encode information in the number of piece messages sent in each interval τ. He can send at most $\log_2(cτ/\text{minsize})$ bits per interval. Delay variance in the Internet makes counting on intervals shorter than a few hundred milliseconds difficult. To obtain an upper bound, assume it is possible to accurately count the number of packets arriving in 10 ms intervals. Let c be 1 Gbps and set minsize to $2^{13}$. Then the smuggle rate is $$\frac{1}{\tau}\log_2 \frac{1 \text{ Gbps} \cdot 100 \text{ ms}}{2^{13} \text{ bytes}} = 725 \text{ bps}.$$

Regardless of minsize, $\log_2 c$ is a vanishingly small fraction of capacity.

If a user wishes to encode information in the order of packets then if n piece messages are sent then there are at most n! orderings of those piece messages. The number of bits worth of information encoded in the ordering is at most $\log_2 n!$, which according to Stirling's approximation is $\approx (n \ln n - n)$ $\log_2$ e for any substantially large n. With $2^{13}$ minimum message size in bytes, a user with a 1 Gbps access link could send at most 15258 messages per second. After an hour, he or she could send $\approx$159 MB hidden in $\approx$420 GB for an overhead of 0.037%. After a day, he or she could send 4.4 GB hidden in $\approx$9.8 TB for an overhead of 0.044%. This is acceptable.

By adding size constraints to content verification engine 304, it constrains smuggling attacks based on modifying content, order, size, or quantity of piece messages.

We are thus left with attacks based on the quantity, order, or contents of have and request messages. If content verification engine 304 has access to both directions of a connection then content verification engine 304 could declare infractions when the number of requests exceeds the number of piece messages by a constant. However, this would likely interfere with end-game mode during which a BitTorrent client sends requests for a piece to all peers that have the piece. If content verification engine 304 is currently monitoring c connections in the same torrent from the same peer, then the number of observed requests sent per observed piece message received is no more than c. However, a requesting peer can queue a number of requests in the serving peer, so the number of requests sent when entering endgame mode can greatly exceed c.

To solve the problem of smuggling bits inside request and have messages, in one embodiment content verification engine 304 reclassifies excessive requests and haves to default or worse service treatment but does not declare an infraction. This allows content verification engine 304 a moderate response to suspicious but potentially valid behavior.

System 300 in one embodiment reclassifies haves and requests that exceed a fraction of the rate of bytes in piece messages, though this may infrequently penalize valid transfers. Separate token buckets may be used for haves and requests. The token buckets start full with $\sigma_h$ and $\sigma_r$ tokens respectively. For each have or request, the corresponding token bucket's token count is decremented by 1. For each piece message, the token count is incremented in the token buckets by $\rho_h$ and $\rho_r$ respectively. When a packet arrives, the have token bucket is empty, i.e., the token count is zero, the packet is searched for have, and piece messages. If the packet contains no piece message but contains a have then the packet is reclassified. The equivalent occurs for requests when the request token bucket is empty. We call this the have-request reclassification method.

During end-game mode, there can be multiple requests for each piece message. However, a requesting peer queues at most q requests at any serving peer. If we know q and c then we set $\rho_r$=c and $\sigma_r$=q c. Setting $\rho_r$ and $\sigma_r$ thus turns out excessive; below, we change these values.

The BitTorrent mainline client computes the maxi-mum number of requests queued as $$q = 2 + \left\lfloor \frac{4 \cdot thruput}{blocksize} \right\rfloor, \quad (10)$$

where thruput is the connection's download rate in bytes per second. Equation (10) is equivalent to allowing 4 bw-delay products worth of blocks assuming propagation delays never exceed 1 second in the Internet. The BitTorrent v1.0 standard says nothing about how many requests to queue, and the behavior differs between clients. This is one reason why we propose reclassification rather than declaring infractions when faced with excessive requests.

A peer completing reception of a piece sends a have message to all other peers in the torrent. Thus we suggest setting $\sigma_h$=c. In the limit as the number of messages transferred grows large, the ratio between have messages and piece messages depends on block and piece lengths as follows $$\frac{\text{number of haves}}{\text{number of pieces}} \leq \frac{c \cdot maxblocksize}{piecelen} \quad (11)$$

where c, maxblocksize, and piecelen are all known by content verification engine 304. The standard specifies that block size should not exceed $2^{17}$. Substituting for max block size and letting m denote the limiting fraction of haves to pieces, Equation (11) becomes $$m \leq \frac{c \cdot 2^{17} \text{ bytes}}{piecelen}. \quad (12)$$

We thus set $\rho_h$=m.

Now we demonstrate how much smuggling reclassification allows.

Consider smuggling by modifying the fields in haves. Content verification engine 304 knows the number of pieces numpieces in the torrent so at most b=$\lceil \log_2$ numpieces$\rceil$ bits can legitimately vary and thus at most b bits can be smuggled in each 72-bit have message. Thus in the limit as the number of bits transferred grows large, the fraction of smuggled bits to all application-layer bits transferred is $$\text{fraction smuggled in haves} \leq \frac{m \cdot b}{m \cdot (72 - b) + (13 + minsize) \cdot 8}, \quad (13)$$

where minsize is the minimum block length in bytes that can occur more than some constant number of times as enforced by at-most-n-below-conventional-minsize. Set minsize=$2^{13}$ bytes, and substitute typical values numpieces=2048 and piecelen=1M=$2^{20}$ bytes=$2^{23}$ bits. We choose typical values for numpieces and piecelen rather than specifying bounds because these values are part of the torrent's metainfo and thus not modifiable by the attacker. The BitTorrent mainline client initiates at most 60 connections and accepts at most 80 remotely initiated connections. For purposes of illustration, assume c does not exceed 140. We use a typical value for c rather than a bound because c is known to content verification engine 304 as the number of monitored connections, which is upper bounded by content verification engine 304 and would normally be much less than 140. Thus when a piece finishes, the expected number of haves is $\leq$140. Substituting values into Equation (12) yields $\rho_h$=m=17.5, and Inequality (13) becomes approximately $$\text{fraction smuggled in haves} \leq 0.29\% \quad (14)$$

A request message has piece index, block offset, and block length fields. At most 64+17=81 bits out of the 17 8=136 bits in each request can smuggle data.

For $\rho_r$=c=140, at most 140 times more requests are transmitted than piece messages. Assuming a minimum block size of $2^{13}$ bytes for the at-most-n-below-conventional-minsize method, then in the limit as the amount transferred grows large, the maximum fraction of bytes that are smuggled without reclassifying is $$\text{fraction smuggled in requests} \leq \frac{c \cdot 81}{c \cdot (136 - 81) + (13 + 2^{13}) \cdot 8} \quad (15)$$

From Inequality (15), the maximum fraction of bytes smuggled in requests is about 15.5%. However, a slight modification to the algorithm can reduce the permitted smuggling. We maintain a separate request token bucket for each direction on each monitored connection and only consider request and piece messages on the same connection where piece in one direction increments the count for the token bucket in the opposite direction. For haves we maintain one token bucket per peer IP which limits all haves sent from that IP for each piece received by that IP. With this modification we set $\rho_r = 1 + \epsilon$ and $\sigma_r = q$, where c might reasonably be set to 0.5, and thus Inequality (15) becomes $$\text{fraction smuggled in requests} \leq \frac{1.5 \cdot 81}{1.5 \cdot (136 - 81) + (13 + 2^{13}) \cdot 8} \quad (16)$$
$$\approx 0.185\%$$

We have thus limited attacks based on modifying the contents and number of have and request messages. Since have and request messages are fixed-length, smuggling based on modifying message lengths does not apply assuming our verifier implements known-syntax verification. However an attacker could still smuggle based on the ordering of have or request messages. If a peer can send 1.5 times more request than piece messages and because request messages are negligible in size compared to piece messages, this roughly increases the total number of messages sent from 1 per unit bandwidth to 2.5 per unit bandwidth. Since the amount of information communicated is $\approx (n \ln n - n) \log_2 e$ where n is the number of messages, repeating the example the additional request messages increase the smuggle rate to $\approx 0.0012\%$ after a day of communication over a 1 Gbps link.

Attacks that reorder have messages are slightly more effective since for a typical $\rho_h = 17.5$, in the limit for a large number of messages there can be as many as 17.5 times more haves than pieces. Since have messages are negligible in size compared to piece messages, the total number of messages roughly increases from 1 per unit bandwidth to 18.5 per unit bandwidth. Using the same example, the smuggle rate becomes $\approx 0.93\%$, which is still tolerable.

Thus with piece message content sampling, at-most-n-below-observed-maxsize, at-most-n-below-conventional-minsize, and have-request reclassification, content verification engine 304 limits the amount of undetectable smuggling possible with attacks that modify the order, content, size, or quantity of piece, request, and have messages. When combined with antiny we limit the number and size of all other messages that can occur more than once, and thus limit the amount of undetectable smuggling possible with attacks that modify the order, content, size, or quantity of messages other than piece, request, and have messages.

Intention Inference

Detecting an infraction provides little indication to the service provider as to the commensurate response. Occasional infractions may occur due to sloppy protocol implementation or due to data corruption on any of the many machines a peer communicates with. We call this problem intention inference.

Simple strategies that work with any qualifying protocol include n-strikes-you're-out, where each strike corresponds to a single infraction and after n strikes within a connection, file transfer, or all of an end-system's file transfers, the infractions are declared intentional.

Transfer of a single file containing invalid content could lead to a large number of infractions. A reasonable system provides policy controls for the service provider to tune response based not only on the number of infractions within a file but also on the number of connections discovered committing infractions and the number of file transfers discovered committing infractions. Thus we have n,m,p-strikes-you're-out filters, which trigger different policy responses when a connection commits infractions, m connections commit n infractions each, and p files have m connections that commit n infractions.

Further variants include infraction-rate-triggers, which measure the rate of infractions. If the content transmitted containing infractions is less than a specific fraction of the overall content transfer rate then the infractions are ignored. An infraction rate trigger can be implemented using a token bucket. The token bucket starts full with count equal to a. For every $\rho$ bytes of valid data transferred, the token bucket's counter is incremented. For every infraction, the token bucket's counter is decremented. When sampling, the token bucket is incremented every $\rho$ valid samples. If the token bucket runs dry, then an intentional infraction is declared and the appropriate policy response triggered. Token buckets can also be used to trigger individual strikes in n-strikes-you're-out and n,m,p-strikes-you're-out.

Culprit Identification

For qualifying protocols that operate peer-to-peer, there is an inherent ambiguity in whom to punish when intentional infractions are detected. An end-system that sends enough bad data is probably culpable. However, a receiving peer or a sending cache may not be culpable.

A peer could send random bad data to peers that are legitimately trying to download valid content. Blocking communication to the receiver would open the peer-to-peer system to invalid-content-based denial-of-service attacks. How to distinguish receiver culpability depends on the behavior of the qualifying protocol. In the case of BitTorrent, most client implementations respond to downloading a number of pieces that fail hash checks by closing the connection and banning future connection attempts from that peer.

System 300 therefore uses in one embodiment an intention timeout. A timer is started after what would otherwise be declared as an intentional infraction that times out after a period longer than round-trip times typically found on the Internet. If the connection does not close within this time then the intention inference method triggers the appropriate policy response and/or elevates the infraction to intention inference mechanisms operating across multiple connections or files. If the timeout period is large enough, connection round-trip times do not have to be explicitly measured. A reasonable timeout period in one embodiment $\tau$ is three to ten seconds.

If the infraction-committing connection is closed within the timeout then the intention inference method either forgets state regarding the connection's infractions or triggers a different policy response. The policy response could be as little as logging the infractions.

Online-Versus-Offline Verification

The verification methods described in prior sections can be performed either on data that is directed immediately through content verification engine 304 before being forwarded by the network device, in parallel to being forwarded allowing content verification engine 304 to operate outside the flow of packets, or samples can be logged for later verification. The last case would be considered offline verification.

The Complete Verifier

Among all of the methods we have proposed, the most complete network-layer verifier for BitTorrent that is still efficient enough to handle highly aggregated traffic implements the methods in Table II (FIG. 13). Some of these methods apply to any qualifying protocol, but no conjecture as to the effectiveness of the resulting verifier can be made without intimate knowledge of the protocol.

The resulting content verification engine 304 requires O(1) state, randomly samples bytes from randomly chosen connections, and minimizes the effectiveness and eventually catches attacks that manipulate the contents, quantity, ordering, or size of messages while still allowing reasonably small or infrequent messages to be added to the protocol without requiring redeployment of verifiers.

Other methods may be substituted among those pro-posed to reduce implementation complexity or state, but usually at some cost to the scalability, infraction detection speed, or accuracy of content verification engine 304.

Content Directory Service

The purpose of content directory service 306 is to map from a unique content ID to a particular QoS service description. The unique content ID either appears directly in messages or is derived from such an id (e.g., BitTorrent's info-hash) as described above.

When a service provider's content classifier encounters a content ID for which it has no cached service description, it queries zero or more service provider policy management components which cache service descriptions and apply locally-defined ISP policy. If the policy management component does not have the service description for the content, it queries the content directory 306.

The content directory 306 can be either centralized or de-centralized. The centralized embodiment runs on one or more trusted servers assumed to be secure. The decentralized embodiment runs across peers where security is provided via cryptography.

A service provider can maintain references to more than one such content directory. If the content ID provides no information about the content provider, which is true for BitTorrent infohashes, then the service provider queries each content directory until a match is found or until all content directories have been queried. If multiple matches occur, the ISP implements a form of resolution. In practice, such collisions should be avoided if possible.

Decentralized Directory Service

An alternate solution to the centralized service embodiment is to implement the directory service on top of a Distributed Hash Table (DHT) such as Chord, CAN, Pastry, Tapestry, or Kademlia, as known in the art. DHTs provide traditional hash table operations to get and put key-value pairs, except the DHT distributes the key-values pairs across peers potentially all of the peers using the qualifying protocol. The key is the content ID, the value is minimally a digitally signed service treatment and payer ID, i.e., sign(A, <content, payer, service>)

where A is the private key of a payer or a mutually agreed upon third party. content is the content ID and payer is a payer ID. The argument in angle brackets is signed. The payer is either the content provider or some entity distributing the content provider's content. service refers to the service treatment. Additional information may be included in the response inside or outside the digitally signed part. The ISP obtains the necessary public key via an external means. The public key may be included with the digital signature if it is part of a digital certificate that is itself verifiable, e.g., from a certification hierarchy.

End-System-Presented Service Requests and Credentials

As an alternative to having the service provider edges or policy components contact a content directory, the end-system can provide credentials to the network infrastructure authorizing it to receive a given service treatment. ATM and IETF RSVP provide signaling protocols to communicate per-flow service requirements to the network. In system 300, the infrastructure is signaled once-per-content as opposed to once-per-connection.

System 300 also enables content-based user service requests. Minimally, the end-user sends a service request either to an edge device known via some external means or toward any peer or cache belonging to the torrent. In the latter case, network infrastructure sitting in the path of packets intercepts the message. The message minimally carries the following information:

<content, service> where content ID is obtained/derived as described above, and service is the service treatment. The message can also carry a unique peer or user ID. When absent the message's source IP address or the message receiver's incoming network interface can be used to identify the user.

The <user, content> ID pair can then be used to bill the user directly for the improved service treatment.

The content classifier(s) sitting in the path of the user's packets then maintain a mapping from the <user, content> on to the appropriate service treatment. Content verifier(s) then ensure that the user only obtains the specified service treatment for the specified content.

If plaintext methods are insufficient, there are various ways to secure the service request including public-key-based digital signatures, and symmetric encryption using a shared secret between the service provider and the user.

The content-based user service requests method in one embodiment allows for remuneration to the ISP directly from end-users.

To retain the notion of remuneration from a content provider or Content Distribution Network (CDN), a user-presented content-based credentials method is provided. The credentials are presented in the same way as service requests, except the message carries the following information:

sign(A, <content, payer, service>)

i.e., the exact same information that is obtained from a DHT-based content directory.

One drawback of the user-presented methods is that they require upgrading end-systems to perform handshakes with network infrastructure. Arguably the decentralized method of implementing the content directory building block also requires upgrading peers to provide the DHT. However, the decentralized content directory works for all peers using qualifying protocols even when only a subset of the peers engage in the DHT.

TTL-Limited Service Descriptions

On timescales of days or weeks, if system 300 associates a Time-To-Live (FIL) with service descriptions, the CDN can reclassify content as it moves from new release to back-catalog. On timescales of days, hours, or shorter, TTLs would also allow the CDN to reissue service descriptions in accordance with the amount of capacity provided by seeding peers.

The service treatment obtained from the content directory can specify improved service for pay content. The ISP can collect unique user IDs within the ISP that downloaded the content identified by each classified content ID. The user ID can be the user's IP address. The ISP can forward the unique content-user ID pairs to a payer such as a content provider or content distribution network that remunerates the ISP for bearing the content across the service provider's network.

The present invention has been described in particular detail with respect to a limited number of embodiments. Those of skill in the art will appreciate that the invention may additionally be practiced in other embodiments. Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of node creation module 202, link creation module 204 and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A method for routing network traffic, the method comprising:
   receiving, by a router, data for transmission over a connection;
   assigning, by the router, a preliminary connection routing classification to the received data by:
      extracting, by the router, a content identifier from the received data;
      determining, by the router, based on the extracted content identifier whether the received data is representative of paid content or non-paid content; and
      determining, by the router, the preliminary connection routing classification for the received data based on the determination of whether the received data is representative of paid content or non-paid content;
   mapping, by the router, the received data to a preliminary service treatment associated with the preliminary connection routing classification;
   routing, by the router, the received data over the connection with a priority associated with the preliminary service treatment; and
   verifying the preliminary classification routing classification as appropriate for the received data.

2. The method of claim 1, wherein the extracted content identifier comprises the output of a hash function applied to at least one selected from the group consisting of:
   a portion of the received data; and
   metadata associated with the received data.

3. The method of claim 1, further comprising:
   associating the preliminary connection routing classification with the connection; and
   responsive to receiving additional data for transmission over the connection, routing the received data over the connection with the priority associated with the preliminary connection routing classification.

4. The method of claim 1, wherein the preliminary connection routing classification comprises a default classification.

5. The method of claim 1, wherein assigning a preliminary connection routing classification to the received data comprises redirecting the received data to a content classification engine.

6. The method of claim 1, wherein verifying the preliminary connection routing classification as appropriate for the received data comprises:
    extracting a portion of the received data;
    calculating a content identifier based on the extracted portion of received data; and
    comparing the calculated content identifier to a stored content identifier, the stored content identifier associated with the preliminary connection routing classification.

7. The method of claim 6, wherein calculating a content identifier based on the extracted portion of received data comprises:
    applying a hash function to the extracted portion of received data.

8. The method of claim 6, wherein the extracted portion of received data comprises a subset of the received data.

9. A router system for routing network traffic, the router system comprising:
    receiving means for receiving data for transmission over a connection;
    a content classification engine, communicatively coupled to the receiving means, adapted to assign a preliminary connection routing classification to the received data by:
        extracting a content identifier from the received data;
        determining based on the extracted content identifier whether the received data is representative of paid content or non-paid content; and
        determining the preliminary connection routing classification for the received data based on the determination of whether the received data is representative of paid content or non-paid content;
    a content directory, communicatively coupled to the content classification engine, adapted to map the received data to a preliminary service treatment associated with the preliminary connection routing classification;
    routing means, communicatively coupled to the receiving means, adapted to route the received data over the connection with a priority associated with the preliminary service treatment; and
    a content verification engine, communicatively coupled to the content classification engine, adapted to verify the preliminary connection routing classification as appropriate for the received data.

10. The system of claim 9, wherein the extracted content identifier comprises the output of a hash function applied to at least one selected from the group consisting of:
    a portion of the received data; and
    metadata associated with the received data.

11. The system of claim 9, wherein the content classification engine is further adapted to:
    associate the preliminary connection routing classification with the connection; and
    responsive to receiving additional data for transmission over the connection, route the received data over the connection with the priority associated with the preliminary connection routing classification.

12. The system of claim 9, wherein the preliminary connection routing classification comprises a default classification.

13. The system of claim 9, wherein the content verification engine is adapted to verify the preliminary connection routing classification as appropriate for the received data by:
    extracting a portion of the received data;
    calculating a content identifier based on the extracted portion of received data; and
    comparing the calculated content identifier to a stored content identifier, the stored content identifier associated with the preliminary connection routing classification.

14. The system of claim 13, wherein the content verification engine is adapted to calculate the content identifier based on the extracted portion of received data by:
    applying a hash function to the extracted portion of received data.

15. The system of claim 14, wherein the extracted portion of received data comprises a subset of the received data.

16. A non-transitory computer-readable storage medium storing computer-executable instructions that, when executed by a processor of a router, cause the processor to perform a process for routing network traffic, the process comprising:
    receiving data for transmission over a connection;
    assigning a preliminary connection routing classification to the received data by:
        extracting a content identifier from the received data;
        determining on the extracted content identifier whether the received data is representative of paid content or non-paid content; and
        determining the preliminary connection routing classification for the received data based on the determination of whether the received data is representative of paid content or non-paid content;
    mapping the received data to a preliminary service treatment associated with the preliminary connection routing classification;
    routing the received data over the connection with a priority associated with the preliminary service treatment; and
    verifying the preliminary classification routing classification as appropriate for the received data.

17. The computer-readable storage medium of claim 16, wherein the extracted content identifier comprises the output of a hash function applied to at least one selected from the group consisting of:
    a portion of the received data; and
    metadata associated with the received data.

18. The computer-readable storage medium of claim 16, further comprising:
    associating the preliminary connection routing classification with the connection; and
    responsive to receiving additional data for transmission over the connection, routing the received data over the connection with the priority associated with the preliminary connection routing classification.

19. The computer-readable storage medium of claim 16, wherein the preliminary connection routing classification comprises a default classification.

20. The computer-readable storage medium of claim 16, wherein assigning a preliminary connection routing classification to the received data comprises redirecting the received data to a content classification engine.

* * * * *

UNITED STATES PATENT AND TRADEMARK OFFICE
CERTIFICATE OF CORRECTION

PATENT NO.         : 8,391,143 B2
APPLICATION NO.    : 13/096828
DATED              : March 5, 2013
INVENTOR(S)        : Bram Cohen and David Harrison Page 1 of 1

It is certified that error appears in the above-identified patent and that said Letters Patent is hereby corrected as shown below:

In the Claims:

Column 32, line 25, after "determining" insert --based--.

Signed and Sealed this
Sixth Day of August, 2013

Teresa Stanek Rea
*Acting Director of the United States Patent and Trademark Office*